US011140564B2

(12) United States Patent
Jo et al.

(10) Patent No.: US 11,140,564 B2
(45) Date of Patent: Oct. 5, 2021

(54) METHOD AND APPARATUS FOR PERFORMING RADIO ACCESS NETWORK FUNCTION

(71) Applicant: SAMSUNG ELECTRONICS CO., LTD., Suwon-si (KR)

(72) Inventors: Hyuna Jo, Suwon-si (KR); Jihun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/884,476

(22) Filed: May 27, 2020

(65) Prior Publication Data
US 2020/0382975 A1 Dec. 3, 2020

(30) Foreign Application Priority Data

| May 28, 2019 | (KR) | 10-2019-0062789 |
| Jul. 31, 2019 | (KR) | 10-2019-0093433 |
| Nov. 13, 2019 | (KR) | 10-2019-0145408 |

(51) Int. Cl.
| *H04L 12/24* | (2006.01) |
| *H04W 24/04* | (2009.01) |
| *H04W 28/16* | (2009.01) |
| *H04W 24/08* | (2009.01) |

(52) U.S. Cl.
CPC .......... *H04W 24/04* (2013.01); *H04W 28/16* (2013.01); *H04W 24/08* (2013.01)

(58) Field of Classification Search
CPC .................................................. H04W 24/04
See application file for complete search history.

(56) References Cited

U.S. PATENT DOCUMENTS

| 8,429,527 B1 * | 4/2013 | Arbogast ............... G06Q 10/06 |
| | | 715/255 |
| 8,948,774 B2 | 2/2015 | Capdevielle et al. |
| 9,716,617 B1 | 7/2017 | Ahuja et al. |
| 9,729,396 B2 | 8/2017 | Rosa de Sousa Teixeira et al. |

(Continued)

FOREIGN PATENT DOCUMENTS

| EP | 3 013 095 A1 | 4/2016 |
| EP | 3 282 359 A1 | 2/2018 |

(Continued)

OTHER PUBLICATIONS

European Search Report dated Jul. 20, 2020 for EP Application No. 20168368.7.

(Continued)

*Primary Examiner* — Parth Patel
(74) *Attorney, Agent, or Firm* — Nixon & Vanderhye P.C.

(57) ABSTRACT

Provided are a method and/or apparatus for performing a radio access network (RAN) function in a wireless communication system. A server performing a radio access network (RAN) function may be configured to obtain traffic processing information about a plurality of base stations (BSs) connected to the server, obtain information about traffic to occur in the plurality of BSs, based on the traffic processing information, and adjust a resource and/or the number of software components (SCs) to virtualize a RAN function in the server, based on the information about the traffic to occur in the plurality of BSs.

13 Claims, 25 Drawing Sheets

(56) References Cited

U.S. PATENT DOCUMENTS

| | | | |
|---|---|---|---|
| 10,405,254 B2 | 9/2019 | Salem et al. | |
| 10,567,288 B1* | 2/2020 | Mutnuru | H04L 67/1021 |
| 10,827,387 B2* | 11/2020 | Tsuda | H04W 24/08 |
| 2007/0072645 A1 | 3/2007 | Clark et al. | |
| 2007/0133468 A1 | 6/2007 | Hara | |
| 2009/0281865 A1* | 11/2009 | Stoitsev | G06Q 10/06312 |
| | | | 705/7.22 |
| 2010/0150076 A1 | 6/2010 | Nakata | |
| 2010/0331037 A1* | 12/2010 | Jen | H04L 1/1887 |
| | | | 455/522 |
| 2012/0244873 A1* | 9/2012 | Capdevielle | H04W 28/26 |
| | | | 455/452.2 |
| 2012/0254443 A1* | 10/2012 | Ueda | G06F 9/5083 |
| | | | 709/226 |
| 2012/0313900 A1* | 12/2012 | Dahl | G06F 3/043 |
| | | | 345/177 |
| 2013/0109373 A1* | 5/2013 | Watanabe | H04W 52/0206 |
| | | | 455/422.1 |
| 2013/0326532 A1* | 12/2013 | Fujimaki | G06F 9/50 |
| | | | 718/104 |
| 2014/0067804 A1* | 3/2014 | Yoshizawa | G06F 16/284 |
| | | | 707/736 |
| 2014/0258456 A1* | 9/2014 | Lee | H04L 69/22 |
| | | | 709/217 |
| 2015/0043390 A1* | 2/2015 | Wang | H04L 5/1469 |
| | | | 370/280 |
| 2015/0131468 A1* | 5/2015 | Navarro | H04W 24/02 |
| | | | 370/252 |
| 2015/0358248 A1* | 12/2015 | Saha | H04L 47/12 |
| | | | 709/226 |
| 2016/0043944 A1* | 2/2016 | Felstaine | H04L 47/12 |
| | | | 370/389 |
| 2016/0057732 A1 | 2/2016 | Li et al. | |
| 2016/0100330 A1 | 4/2016 | Broustis et al. | |
| 2016/0127169 A1* | 5/2016 | Rosa de Sousa Teixeira | |
| | | | H04L 43/08 |
| | | | 370/216 |
| 2016/0205519 A1* | 7/2016 | Patel | H04L 41/5041 |
| | | | 455/518 |
| 2016/0269297 A1* | 9/2016 | Mahindra | H04L 47/125 |
| 2016/0353465 A1 | 12/2016 | Vrzic et al. | |
| 2016/0381575 A1* | 12/2016 | Tofighbakhsh | H04L 63/083 |
| | | | 709/224 |
| 2017/0078974 A1* | 3/2017 | Koutsimanis | H04W 52/242 |
| 2017/0222770 A1* | 8/2017 | Liu | H04B 1/7143 |
| 2017/0264500 A1* | 9/2017 | Koizumi | G06F 9/505 |
| 2017/0295066 A1* | 10/2017 | Ellis | H04L 49/70 |
| 2017/0317914 A1 | 11/2017 | Yoon et al. | |
| 2017/0318468 A1* | 11/2017 | Aijaz | H04W 16/10 |
| 2018/0124660 A1* | 5/2018 | Zhang | H04W 36/0055 |
| 2018/0176289 A1* | 6/2018 | Watanabe | G06F 9/505 |
| 2018/0284870 A1 | 10/2018 | On | |
| 2019/0052549 A1* | 2/2019 | Duggal | G06Q 30/04 |
| 2019/0174554 A1* | 6/2019 | Deenoo | H04W 76/27 |
| 2019/0182711 A1* | 6/2019 | Senju | H04W 28/0284 |
| 2019/0253930 A1* | 8/2019 | Senju | G06F 9/45558 |
| 2019/0319686 A1* | 10/2019 | Chen, IV | H04W 72/046 |
| 2019/0340273 A1* | 11/2019 | Raman | G06F 9/5061 |
| 2019/0364492 A1* | 11/2019 | Azizi | H04W 52/0264 |
| 2019/0391855 A1* | 12/2019 | Bernat | G06F 9/5094 |
| 2020/0059829 A1* | 2/2020 | Joseph | H04W 36/08 |
| 2020/0162348 A1* | 5/2020 | Suthar | H04W 24/02 |
| 2020/0205017 A1* | 6/2020 | Takahashi | H04W 24/02 |
| 2020/0329354 A1* | 10/2020 | Rashid | H04L 67/1002 |
| 2020/0382439 A1* | 12/2020 | Inoue | H04L 47/801 |

FOREIGN PATENT DOCUMENTS

| | | |
|---|---|---|
| KR | 10-2007-0052019 | 5/2007 |
| KR | 10-2012-0056296 | 6/2012 |
| KR | 10-1461372 B1 | 11/2014 |
| KR | 10-2016-0029415 | 3/2016 |
| KR | 10-2017-0062235 | 6/2017 |
| KR | 10-2018-0060144 | 6/2018 |
| KR | 1884708 | 8/2018 |
| KR | 10-2018-0108940 | 10/2018 |
| KR | 10-2018-0125739 | 11/2018 |
| KR | 10-1966430 | 4/2019 |
| KR | 10-2016683 | 8/2019 |
| WO | WO 2015/133078 | 11/2015 |
| WO | WO 2017/074486 | 5/2017 |

OTHER PUBLICATIONS

European Search Report dated Sep. 8, 2020 for EP Application No. 20175935.4.

International Search Report and Written Opinion dated Sep. 11, 2020 for PCT/KR2020/006830, 11pgs.

International Search Report and Written Opinion dated Aug. 28, 2020 for PCT/KR2020/006842, 8 pgs.

Sun et al., "Based Station Popularity-Based Dynamic Resource Allocation for VNF", 2019 2$^{nd}$ International Conference on Communication Engineering and Technology, 7 pgs.

Rakovic et al., "Dynamic Virtual Resource Allocation in Virtualized Multi-RAT Cellular Networks" Wireless Pers Commun (2017), 16pgs.

Garcia-Saavedra, "Joint Optimization of Edge Computing Architectures and Radio Access Networks", IEEE Journal on Selected Areas in Communications, vol. 36, No. 11, Nov. 2018, 11pgs.

* cited by examiner

METHOD AND APPARATUS FOR PERFORMING RADIO ACCESS NETWORK FUNCTION

CROSS-REFERENCE TO RELATED APPLICATIONS

This application is based on and claims priority under 35 U.S.C. § 119 to Korean Patent Application No. 10-2019-0062789, filed on May 28, 2019, Korean Patent Application No. 10-2019-0093433, filed on Jul. 31, 2019 and Korean Patent Application No. 10-2019-0145408, filed on Nov. 13, 2019 in the Korean Intellectual Property Office, the disclosures of which are incorporated by reference herein in their entireties.

BACKGROUND

1. Field

The disclosure relates to a method and apparatus for performing a radio access network (RAN) function(s).

2. Description of Related Art

To meet increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication systems such as sensor networks, machine-to-machine (M2M) communication, machine-type communication (MTC), or the like are implemented by using techniques including beamforming, multiple-input and multiple-output (MIMO), array antennas, or the like. Application of cloud radio access network (Cloud-RAN) as the above-described big data processing technology may be an example of convergence of 5G communication technology and IoT technology.

Because various technologies can be applied due to the aforementioned technical features and the development of wireless communication systems, methods for efficiently managing a RAN by using such various technologies are required.

SUMMARY

Embodiments of the disclosure provide a method and apparatus for performing a radio access network (RAN) function in a wireless communication system.

Additional aspects will be set forth in part in the description which follows and, in part, will be apparent from the description.

According to an example embodiment of the disclosure, a method of performing, by a server, a radio access network (RAN) function includes obtaining traffic processing information about a plurality of base stations (BSs) connected ("connected" may refer to, for example, one or more of operatively connected, electrically connected, and/or communicatively connected) to the server; obtaining information about traffic to occur in the plurality of BSs, based on the traffic processing information; and adjusting at least one of (a) a resource, or (b) the number of software components (SCs), to virtualize at least one RAN function in the server, based on the information about the traffic to occur in the plurality of BSs.

The traffic processing information may include information about traffic occurred in the plurality of BSs during at least one time period, and information about a resource used in processing the traffic.

The obtaining of the traffic processing information may include receiving the traffic processing information from the plurality of BSs or an external device connected to the server.

The adjusting may include increasing the number of the SCs when an amount of the traffic to occur in the plurality of BSs is to increase, and decreasing the number of the SCs when an amount of the traffic to occur in the plurality of BSs is to decrease.

The adjusting may include adjusting the number of the SCs in a unit of a package including a plurality of SCs.

The obtaining of the information about the traffic to occur may include identifying a pattern of an amount of traffic occurred in each of time-frequency resource domains, based on the traffic processing information; and obtaining information about traffic to occur in a particular time-frequency resource domain, based on the pattern of the amount of the traffic.

The adjusting may include, when an amount of traffic to occur in a particular RAN function is increased, increasing a resource of a SC to perform the particular RAN function, and when an amount of traffic to occur in the particular RAN function is decreased, decreasing the resource of the SC to perform the particular RAN function.

The method may further include obtaining information about an event that is scheduled with respect to the plurality of BSs and causes a change in traffic, and the obtaining of the information about the traffic to occur may include identifying, based on the traffic processing information, an amount of traffic occurred in the plurality of BSs according to each of events; and comparing the identified amount of the traffic according to each of the events with the event scheduled with respect to the plurality of BSs, and thus obtaining the information about the traffic to occur in the plurality of BSs.

The RAN function may include at least one of a physical (PHY) layer function, a medium access control (MAC) layer function, a radio link control (RLC) layer function, or a packet data convergence protocol (PDCP) layer function.

The SC may include at least one of a container or a virtual machine (VM).

According to an example embodiment of the disclosure, a server performing a RAN function includes a transceiver; a memory storing one or more instructions; and at least one processor configured to execute the one or more instructions stored in the memory to obtain traffic processing information about a plurality of BSs connected to the server; obtain information about traffic to occur in the plurality of BSs, based on the traffic processing information; and adjust at least one of a resource or the number of SCs, to virtualize at least one RAN function in the server based on the information about the traffic to occur in the plurality of BSs.

According to an embodiment of the disclosure, provided is a computer program product including a computer-readable recording medium having recorded thereon a program by which a server performs a method of performing a RAN function, the method including obtaining traffic processing information about a plurality of BSs connected to the server; obtaining information about traffic to occur in the plurality of BSs, based on the traffic processing information; and adjusting a resource or the number of SCs to virtualize at least one RAN function in the server, based on the information about the traffic to occur in the plurality of BSs.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
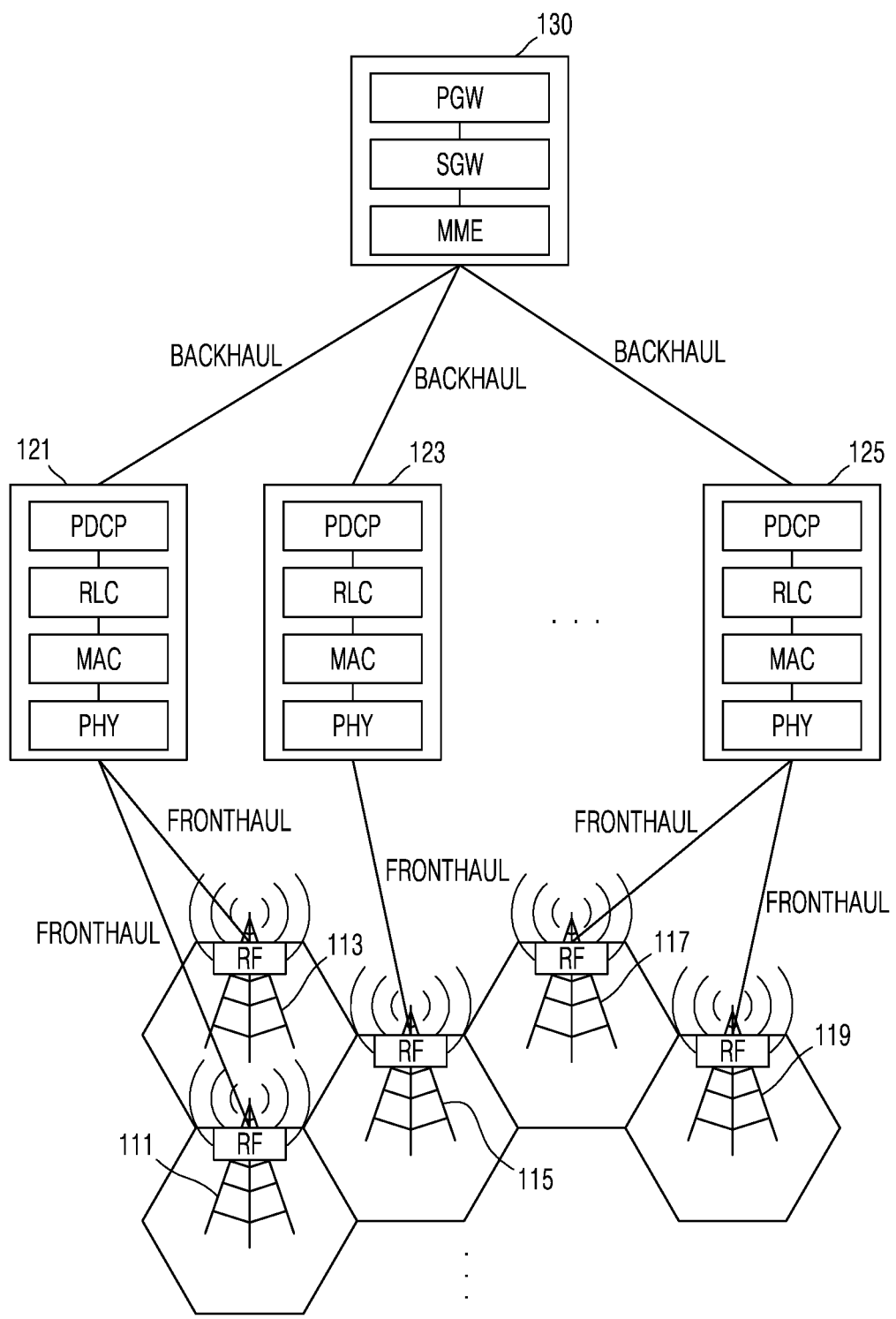
FIG. 1 is a diagram illustrating an example structure of a centralized/cloud radio access network (cRAN) according to an embodiment of the disclosure.

Embodiments of the disclosure will now be described more fully with reference to the accompanying drawings. In the following description of embodiments of the disclosure, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in an embodiment of the disclosure.

Throughout the disclosure, the expression "at least one of a, b or c" indicates only a, only b, only c, both a and b, both a and c, both b and c, all of a, b, and c, or variations thereof.

In the disclosure, a controller may also be referred to as a processor.

Throughout the specification, a layer (or a layer apparatus) may also be referred to as an entity.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-A, and LTE-Pro of the 3GPP, high rate packet data (HRPD) and ultra mobile broadband (UMB) of 3GPP2, 802.16e of the Institute of Electrical and Electronic Engineers (IEEE), or the like. As a next generation wireless communication system, 5th generation (5G) or new radio (NR) wireless communication systems are being established.

In the next generation wireless communication system, at least one of services including enhanced Mobile BroadBand (eMBB), massive Machine Type Communications (mMTC), and Ultra-Reliable and Low-Latency Communications (URLLC) may be provided to the UE. The services may be provided to a same UE or different UEs during a same time period. The eMBB service may be for high-speed transmission of high-volume data, the mMTC service may be for minimization of power of the terminal and accesses by multiple terminals, and the URLLC service may be for high reliability and low latency, but the disclosure is not limited thereto. The services may be primary services in a wireless communication system such as an LTE system or a 5G or new radio/next radio (NR) system after the LTE system.

For convenience of description, in the disclosure, terms and names or modifications of the terms and names defined in the 3rd Generation Partnership Project Long Term Evolution (3GPP LTE) standard are used therein. However, the disclosure is not limited to these terms and names, and may be equally applied to wireless communication systems conforming to other standards. For example, although 5G (or NR) systems are mentioned as examples in the following description, embodiments of the disclosure may also be applied to other wireless communication systems having similar technical backgrounds or channel types. As another example, embodiments of the disclosure may be applied to a LTE or LTE-A system which is a wireless communication system before the NR system, and furthermore, embodiments of the disclosure may be applied to a wireless communication system to be developed after the NR system. Furthermore, embodiments of the disclosure may be applied to other wireless communication systems through partial modifications at the discretion of one of ordinary skill in the art without greatly departing from the scope of the disclosure.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

In the disclosure, a base station is an entity that allocates resources to a terminal, and may be at least one of a gNode B, an eNode B, a Node B, a base station (BS), a radio access unit, a BS controller, or a node on a network In the disclosure, a terminal may include a UE, a MS, a cellular phone, a smartphone, a computer, or a multimedia system capable of performing a communication function.

In the disclosure, a cell may indicate an area covered by one BS in wireless communication. The cell may be classified into a mega cell, a macro cell, a micro cell, or a picocell, based on a size of the cell, but this is merely an example and types of the cell are not limited thereto.

In the disclosure, a downlink (DL) is a wireless transmission path of a signal transmitted from a BS to a UE, and an uplink (UL) is a wireless transmission path of a signal transmitted from a UE to a BS. More particularly, as a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link through which a UE (also referred to as a terminal) or an MS transmits data or a control signal to a BS (e.g., eNB), and the DL refers to a radio link through which a BS transmits data or a control signal to a UE.

FIG. 1 is a diagram for describing a structure of a centralized/cloud radio access network (cRAN).

Referring to FIG. 1, in the cRAN, a radio transceiver (also referred to as a radio unit (RU) and a data processor (also referred to as a data unit (DU)) used to be included in a BS according to the related art are now separate, and thus the radio transceiver is positioned in a BS 111 of a cell site, and the data processor (e.g., a data processor 121) may be positioned in a central server. A cell corresponds to an area covered by a BS in a wireless communication system, and at least one cell may exist for each BS. Unlike an integrated BS where both a radio transceiver and a data processor exist in a cell site, in the cRAN, radio transceivers may be positioned in BSs 111, 113, 115, 117, and 119 of the cell site, and data processors 121, 123, and 125 may be gathered to perform at least some functions among RAN functions. Descriptions of the RAN functions will be provided at a later time. The cRAN may gather and manage the data processors 121, 123, and 125, thereby easily adjusting interference between cells and providing a service including coordinated multi-point transmission and reception (CoMP) or the like.

The BSs 111, 113, 115, 117, and 119 of the cell site may include a radio frequency (RF) device or the like, and may deliver a signal to a data processor (e.g., the data processor 121) through a fronthaul. As shown in FIG. 1, the fronthaul indicates a network portion that connects the BSs 111 and 113 of the cell site to a data processor (e.g., the data processor 121), and may perform digital signal processing (DSP), power amplification, a filtering function, or the like. See also the fronthaul(s) between the other base station(s) 15, 117, 119 and data processor(s) 123, 125, in FIG. 1.

A data processor (e.g., the data processor 121) may process a signal received from a BS (e.g., the BS 111) of the cell site, and may deliver the processed signal to a core network device 130 through a backhaul. The core network device 130 may include devices that connect an end system consisting of or including a BS and a UE. For example, the core network device 130 may include a packet data network gateway (P-GW), a serving gateway (S-GW), a mobile management entity (MME), or the like. The P-GW may connect an internal node of a core network with external internet, may configure an Internet Protocol (IP) address to a UE, and may perform IP packet filtering. The S-GW may buffer a DL packet received from external internet, when radio resource control (RRC) connection is not configured in the UE. The MME may process a control signal related to location registration, authentication, and calls of the UE. However, this is a merely an example, and a configuration of the core network device 130 is not limited to the aforementioned example.

A backhaul indicates a network portion that connects a data processor (e.g., the data processor 121) to the core network device 130 and may be implemented as a wired interface such as an optical fiber, but this is merely an example, and the backhaul may be implemented as a wireless network.

A data processor (e.g., the data processor 121) may perform various RAN functions for processing signals. The RAN functions may include a packet data convergence protocol (PDCP) layer function, a radio link control (RLC) layer function, a medium access control (MAC) layer function, and a physical (PHY) layer function, but this is merely an example and thus, the RAN functions are not limited thereto. Hereinafter, the PDCP layer function, the RLC layer function, the MAC layer function, and the PHY layer function will now be described.

The PDCP layer function may include at least some functions among functions below.

Header compression and decompression: robust header compression (ROHC) only

Transfer of user data

In-sequence delivery of upper layer protocol data units (PDUs)

PDCP PDU reordering

Duplicate detection of lower layer service data units (SDUs))

Retransmission of PDCP SDUs

Ciphering and deciphering

Timer-based SDU discard in UL.

The reordering function of the PDCP layer may include at least one of a function of reordering PDCP PDUs received from a lower layer, on a PDCP sequence number (SN) basis, a function of delivering the reordered data to an upper layer in order, a function of recording missing PDCP PDUs by reordering the received PDCP PDUs, a function of reporting status information about the missing PDCP PDUs to a transmitter, or a function of requesting to retransmit the missing PDCP PDUs.

The RLC layer function may include at least some functions among functions below.

Transfer of upper layer PDUs

In-sequence delivery of upper layer PDUs

Out-of-sequence delivery of upper layer PDUs

Error Correction through automatic repeat request (ARQ)

Concatenation, segmentation and reassembly of RLC SDUs

Re-segmentation of RLC data

Reordering of RLC data

Duplicate detection

Protocol error detection

RLC SDU discard

RLC re-establishment

The in-sequence delivery function of the RLC layer may include a function of delivering RLC SDUs received from a lower layer, to an upper layer in order, and a function of reassembling the RLC SDUs and delivering the reassembled RLC SDU when a plurality of RLC SDUs segmented from one RLC SDU are received. The in-sequence delivery function may also include a function of reordering received RLC PDUs on a RLC SN or PDCP SN basis, a function of recording missing RLC PDUs by reordering the received RLC PDUs, and a function of reporting status information about the missing RLC PDUs to a transmitter. The in-sequence delivery function may also include a function of requesting to retransmit the missing RLC PDUs, and a function of delivering only RLC SDUs prior to a missing RLC SDU, to an upper layer in order when the missing RLC SDU exists. The in-sequence delivery function may also include a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires.

The RLC layer may process RLC PDUs in order of reception, regardless of SNs, and may deliver the RLC PDUs to the PDCP layer. When a segment is received, the RLC layer may reassemble the segment with other segments stored in a buffer or subsequently received, into a whole RLC PDU and may deliver the RLC PDU to the PDCP layer. In a NR system, the RLC layer may not have a concatenation function, and the concatenation function may be performed by the MAC layer or may be replaced with a multiplexing function of the MAC layer.

The MAC layer function may include at least some functions among functions below.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The PHY layer may perform at least some functions among functions below.

Transmission and reception of data by using an electrical signal

Channel coding/decoding function

Modulation/demodulation function

Power control

Cell search

The PHY layer may perform channel coding and modulation on data of an upper layer, may generate an OFDM symbol thereof, and may transmit the OFDM symbol through a wireless channel. Also, the PHY layer may perform demodulation and channel decoding on an OFDM symbol received through a wireless channel, and may deliver data obtained therefrom to an upper layer.

A BS (e.g., the BS 111) of the cell site may be described by using terms such as a RU, a remote radio head (RRH), or the like, and a data processor (e.g., the data processor 121) may be described by using terms such as a DU, a base band unit (BBU), or the like.

To gather and manage the data processors 121, 123, and 125 that perform the aforementioned RAN functions, there may be provided a method of efficiently using physical resources for data processing. To this end, the disclosure provides a method of performing, through virtualization, one or more RAN functions performed by the data processors 121, 123, and 125. The virtualization refer to a technology of extending a resource, which was usable by one device, by integrating and managing a plurality of physical resources. Hereinafter, with reference to FIGS. 2 and 3, examples of a virtualized RAN (vRAN) according to the disclosure will be described.

Figure 2:
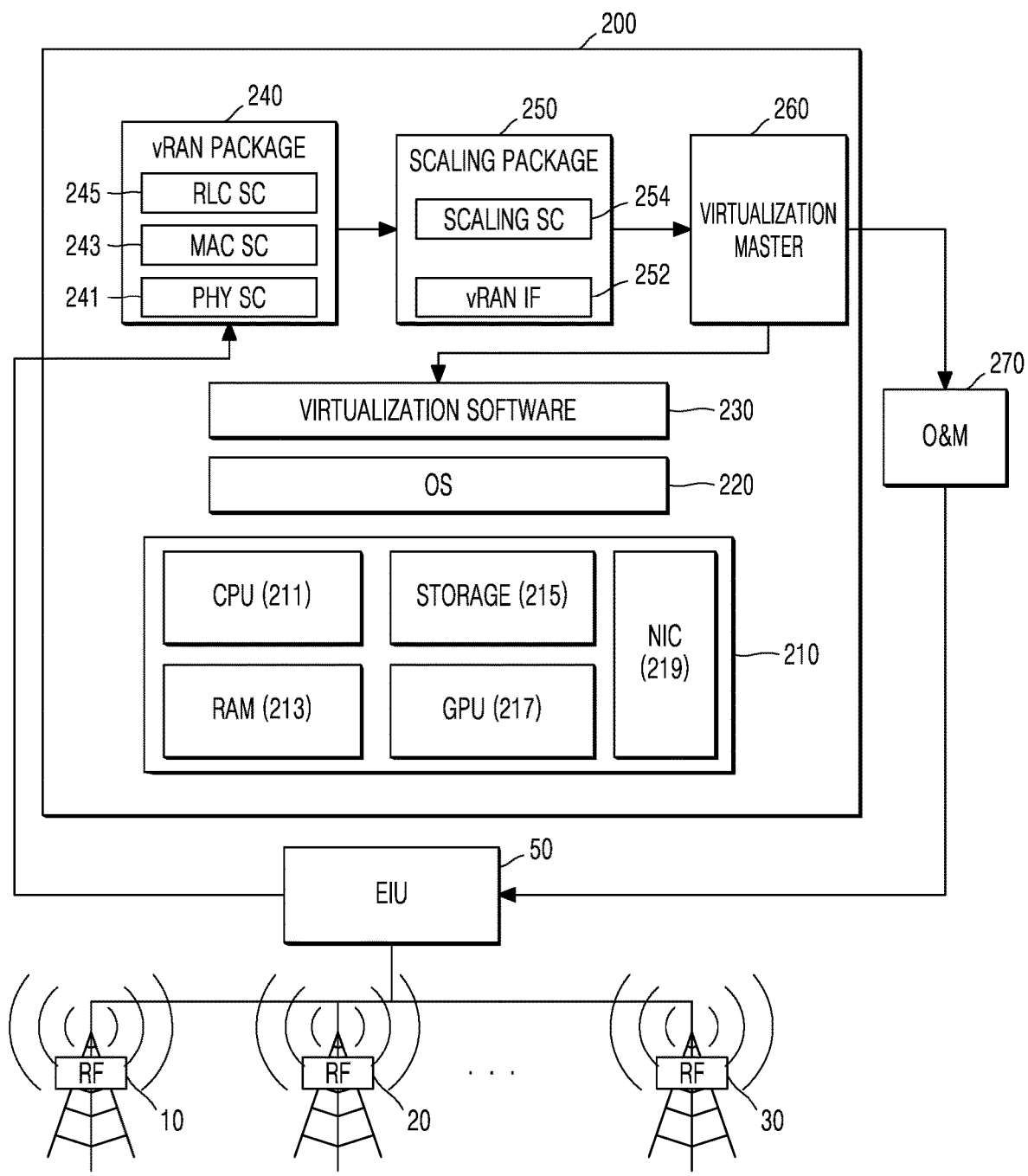
FIG. 2 is a diagram illustrating an example RAN virtualization method, according to an embodiment of the disclosure.

FIG. 2 is a diagram for describing a RAN virtualization method, according to an example embodiment of the disclosure.

Referring to FIG. 2, a server 200 may include hardware 210 capable of driving software for performing a vRAN function. The hardware 210 may include a central processing unit (CPU) 211, a random access memory (RAM) 213, a storage 215, a graphics processing unit (GPU) 217, and a network interface controller (NIC) 219, but this is merely an example, and elements of the hardware 210 are not limited thereto. The storage 215 may include a hard disk drive (HDD), a solid-state drive (SDD), or the like.

One operating system (OS) 220 may operate in the hardware 210. The OS 220 may manage software (e.g., virtualization software 230) that is executed in the hardware 210 and the server 200.

The virtualization software 230 may logically divide a resource managed by the OS 220, and may allow a plurality of software components (SCs) to share the logically divided resource. The resource is an item used for a vRAN package 240 to process traffic. For example, the resource may include at least one of the CPU 211, the RAM 213, the storage 215, the GPU 217, or the like, but this is merely an example, and examples of the resource are not limited thereto. The logical division of the resource may be performed by distributing, through a switch, a physical communication line connecting the resource to the plurality of SCs. An SC indicates a component to be used as a separate server by gathering libraries or applications that are required to perform a particular function, and may be generated or removed in a unit of a package. The package is a minimum unit that shares one IP and may include one or more SCs. An example of the virtualization software 230 may include Kubernetes, and the SC may correspond to a container of the Kubernetes. Each of 240, 241, 243, 245, 250, 252, 254, 260, and 270 may be included in or may be implemented by at least one processor (e.g., see 311) and/or corresponding memory, including circuitry.

According to an embodiment of the disclosure, the SC may be used to perform a network function of the vRAN. Operations of the server 200 to implement the vRAN will now be described in detail.

The server 200 may be connected ("connected" may refer to, for example, one or more of operatively connected, electrically connected, and/or communicatively connected) to a plurality of BSs 10, 20, and 30 (see also BSs 111-119 in FIG. 1) of a cell site via an Ethernet interface unit (EIU) 50. The server 200 may comprise at least one processor. The EIU 50 is a portion of a path connecting the server 200 to the plurality of BSs 10, 20, and 30 of the cell site(s), and for example, traffic of a BS may be delivered to the vRAN package 240 via the EIU 50. Also, as another example, information about the vRAN package 240 to which the plurality of BSs 10, 20, and 30 of the cell site(s) are allocated may be delivered via the EIU 50.

According to an embodiment of the disclosure, the server 200 may perform at least some functions among RAN functions used to be performed by a data processor of an integrated BS. Here, the data processor may correspond to the data processor described above with reference to FIG. 1. Accordingly, a radio transceiver including a RF device may exist in each of the plurality of BSs 10, 20, and 30 of the cell site, and the RAN functions except for functions performed by the plurality of BSs 10, 20, and 30 may be performed by the server 200. For example, a PHY SC 241, a MAC SC 243, and an RLC SC 245 may be generated in the server 200, and the PHY SC 241, the MAC SC 243, and the RLC SC 245 may respectively perform the PHY layer function, the MAC layer function, and the RLC layer function. However, this is merely an example, and RAN functions performed by the server 200 are not limited thereto. Other examples will be described below with reference to FIG. 5 for example.

According to an embodiment of the disclosure, the PHY SC 241, the MAC SC 243, and the RLC SC 245 may be included in one vRAN package 240, or multiple vRAN packages. The vRAN package 240 is a minimum unit that may include one or more SCs, each performing a RAN function. The vRAN package 240 may be configured so as to include instructions for allowing RAN functions to be virtualized and then performed, the RAN functions being used to be performed by a hardware device according to the related art. An SC may be removed or generated in a unit of the vRAN package 240.

The vRAN package 240 may obtain traffic processing information about traffic occurred in the plurality of BSs 10, 20, and 30. Here, the traffic refers to a data flow passing through a communication network in a predefined time. According to an embodiment of the disclosure, the traffic may include a data flow between a UE and a BS (e.g., the BS 10), and may be indicated as a data transmission rate per unit time. The traffic processing information indicates information about a procedure of processing traffic, based on a RAN function. The traffic processing information may include traffic information about traffic which has occurred in a plurality of BSs, and resource information about a resource used in processing the traffic which has occurred in the plurality of BSs. The traffic information is information capable of directly or indirectly indicating an amount and a characteristic of the traffic. The traffic information may include at least one of a traffic processing speed (e.g., bps) per cell, the number of terminals connected to a BS, a bandwidth allocated to the BS, a spectrum sharing ratio between different wireless communication technologies, or the like. As another example, or in addition, the traffic information may include a type of a service causing the traffic, a frequency band in which the traffic occurred, a type of a wireless communication system (e.g., an NR or an LTE) in which the traffic occurred, or the like. The resource information may directly or indirectly indicate a physical resource used in processing the traffic. The resource information may include a ratio of a CPU core to CPU cores allocated to a vRAN package, the CPU core being used in processing the traffic, the number of clock cycles used in processing the traffic, compared to a largest CPU core clock cycle, a size of a memory allocated to the vRAN package so as to process the traffic, or the like. However, these are merely examples, and examples of the traffic information or the resource information are not limited thereto.

The traffic processing information may be received by the vRAN package 240 via the EIU 50 from the plurality of BSs 10, 20, and 30, and according to another embodiment of the disclosure, the traffic processing information may be received from the OS 220 in the server 200 or another external device. For example, the traffic information in the traffic processing information may be received from the plurality of BSs 10, 20, and 30. Also, the resource information in the traffic processing information may be received from the OS 220 in the server 200. However, these are merely examples, and a method, performed by the vRAN package 240, of receiving the traffic processing information is not limited thereto. As another example, the traffic processing information may be obtained as a result of applying, by the vRAN package 240, a statistics method (e.g., an average, variance, or the like) to pre-obtained traffic processing information. The vRAN package 240 may deliver the obtained traffic processing information to a scaling package 250.

The scaling package 250 may comprise a group of instructions for controlling the number of SCs (e.g., an SC 241) and a resource allocated to the SCs (e.g., the SC 241) included in the vRAN package 240. The scaling package 250 may include a vRAN interface (vRAN IF) 252 and a scaling SC 254. The vRAN IF 252 may receive the traffic processing information from the vRAN package 240. As another example, the vRAN IF 252 may obtain, from an external device, information about an event predicted to cause a change in the traffic. For example, the vRAN IF 252 may obtain the information about the event via a core network device. The event corresponds to a reason that causes the change in the traffic with respect to a plurality of BSs.

The scaling SC 254 may obtain, based on the traffic processing information, information about traffic to occur in the plurality of BSs 10, 20, and 30. The information about traffic to occur in the plurality of BSs 10, 20, and 30 is information that directly or indirectly indicates an amount and a characteristic of the traffic predicted to occur in the plurality of BSs 10, 20, and 30. The information about traffic to occur in the plurality of BSs 10, 20, and 30 may include at least one of a predicted traffic processing speed (e.g., bps) per cell, the predicted number of terminals to be connected to a BS, a predicted bandwidth to be allocated to the BS, a spectrum sharing ratio between different wireless communication technologies, or the like. As another example, the information about traffic to occur in the plurality of BSs 10, 20, and 30 may include at least one of a predicted type of a service to cause the traffic, a frequency band in which the traffic is predicted to occur, a type of a wireless communication system (e.g., an NR or an LTE) in which the traffic is predicted to occur, or the like.

An example method by which the scaling SC 254 predicts, based on the traffic processing information, traffic to occur in the plurality of BSs 10, 20, and 30 will be described below with reference to FIG. 6. Also, the scaling SC 254 may determine whether to adjust at least one of the number of SCs or a resource of the SC, based on the information about traffic to occur in the plurality of BSs 10, 20, and 30. In the disclosure, an operation of increasing an amount of a resource to be allocated to the SC is described as "scale up", and an operation of decreasing an amount of a resource to be allocated to the SC is described as "scale down". An operation of increasing the number of the SCs is described as "scale out", and an operation of decreasing the number of the SCs is described as "scale in". The scale up, scale down, scale out, and scale in that are described above may be collectively described as scaling.

When the scaling SC 254 determines to adjust at least one of the number of the SCs and/or the resource to be allocated to each SC, the scaling SC 254 may deliver a scaling command based on the determination to a virtualization master 260. The virtualization master 260 indicates a system that controls the vRAN package 240. The virtualization master 260 may be positioned in the server 200, and according to another embodiment of the disclosure, the virtualization master 260 may be positioned in a device other than the server 200, such as in another processor and/or another server. The virtualization master 260 may deliver the scaling command to the virtualization software 230, and may update and store vRAN package information changed in response to the scaling command. Also, the virtualization master 260 may deliver the updated vRAN package information to an operation and maintenance (O&M) 270. The O&M 270 is a device for controlling a traffic congestion level on a user plane of a UE. In a present embodiment of the disclosure, it is illustrated that the O&M 270 is located in the outside of the sever 200, but this is merely an example, and thus according to another embodiment of the disclosure, the O&M 270 may be positioned in the server 200.

In consideration of an adjusted vRAN package, the O&M 270 may command the EIU 50 to allocate traffic to each of vRAN packages, the traffic occurring in the plurality of BSs 10, 20, and 30. Accordingly, traffic received from at least one of the plurality of BSs 10, 20, and 30 may be newly allocated to the adjusted vRAN package.

The aforementioned RAN virtualization method may be merely an example of implementing a vRAN in the disclosure, and thus another virtualization method may be used. For example, a hypervisor-based virtualization method may be used to implement a vRAN, and this method will now be described with reference to FIG. 3.

Figure 3:
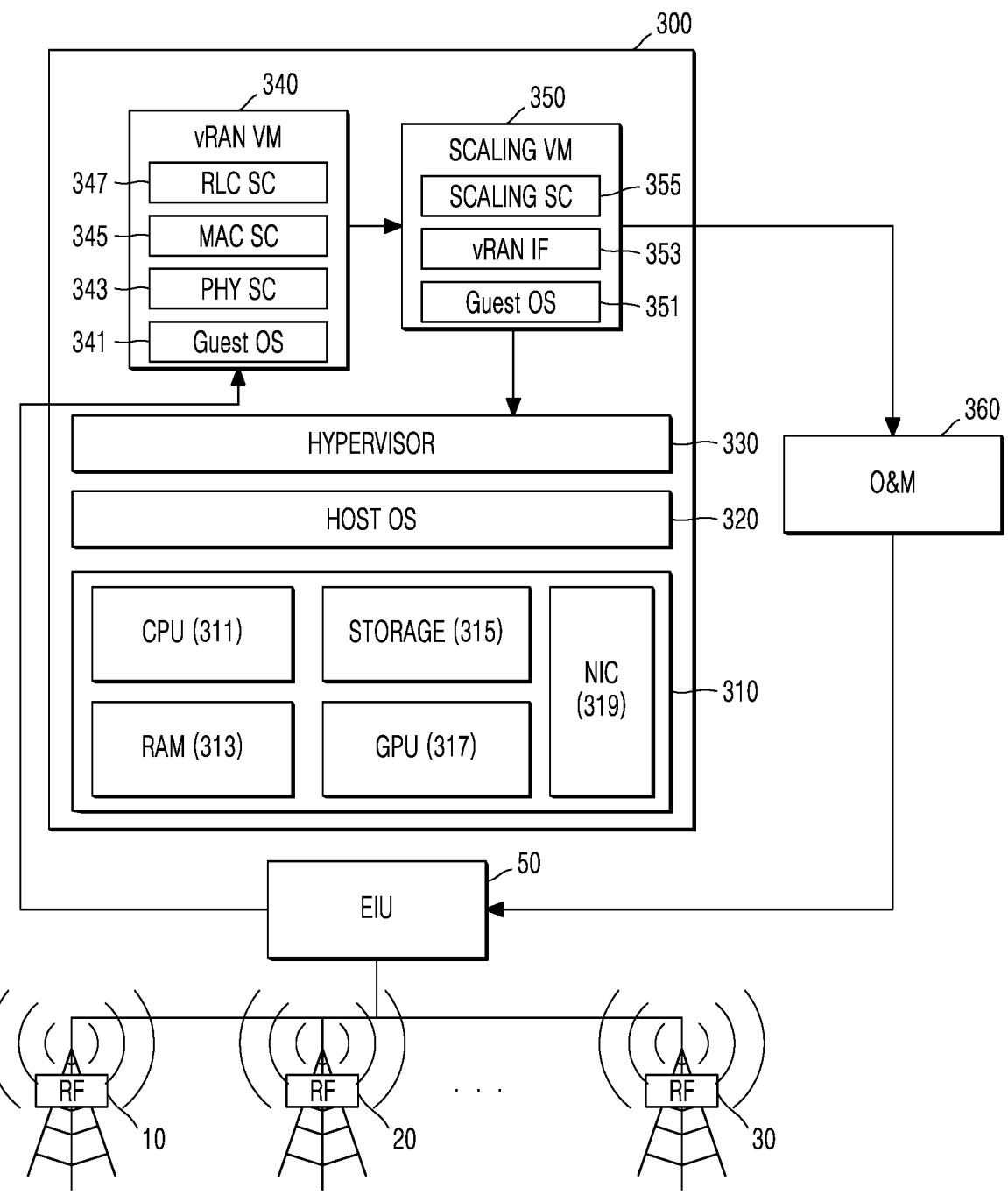
FIG. 3 is a diagram illustrating an example RAN virtualization method, according to another embodiment of the disclosure.

FIG. 3 is a diagram for describing a RAN virtualization method, according to another example embodiment of the disclosure.

Referring to FIG. 3, a server 300 may include hardware 310 capable of driving software for performing a vRAN function. The hardware 310 may include a CPU 311, a RAM 313, a storage 315, a GPU 317, and a NIC 319, but this is merely an example, and elements of the hardware 310 are not limited thereto. The storage 315 may include a HDD, a SDD, or the like. Hereinafter, descriptions about elements of FIG. 3 which correspond to those of FIG. 2 are not provided.

In the hypervisor-based virtualization method, a host OS 320 and at least one guest OS 341 may be driven. The host OS 320 is an OS that manages software (e.g., a hypervisor 330) that is executed in the hardware 310 and the server 300. The guest OS 341 is an OS that is positioned in a vRAN virtual machine (vRAN VM) 340. The hypervisor 330 is software that divides an OS of the server 300 (e.g., the host OS 320) from the hardware 310. However, according to another embodiment of the disclosure, the hypervisor 330 may be embodied as a physical device. Also, the hypervisor 330 may drive a VM in the hardware 310. For example, the hypervisor 330 may help the vRAN VM 340 to execute and manage the guest OS 341. That is, unlike the container-based virtualization method, in the hypervisor-based virtualization method, a plurality of OSs may be executed. Also, the hypervisor 330 may distribute a resource (e.g., the RAM 313, the CPU 311, or the like) of the hardware 310 to VMs.

According to an embodiment of the disclosure, a method of performing a RAN function may involve implementing a vRAN by generating VMs respectively performing the aforementioned RAN functions. According to an embodiment of the disclosure, the vRAN VM 340 may include the guest OS 341, a PHY SC 343, a MAC SC 345, and an RLC SC 347, and operations of the vRAN VM 340 may correspond to operations of the vRAN package 240 described above with reference to FIG. 2. Each of 340, 341, 343, 345, 347, 350, 351, 353, 355, and 370 may be included in or may be implemented by at least one processor and/or corresponding memory, including circuitry (e.g., see 310).

A SC may be used to have a same meaning as a VM process in the hypervisor-based virtualization method. According to an embodiment of the disclosure, a scaling VM 350 may include a guest OS 351, a vRAN IF 353, and a scaling SC 355. The guest OS 351 of the scaling VM 350 may be the same type as the guest OS 341 of the vRAN VM 340, but this is merely an example, and a different OS type may be used. Operations of the scaling VM 350 may correspond to operations of the scaling package 250 described above with reference to FIG. 2. However, when the scaling VM 350 determines to adjust at least one of the number of a plurality of the vRAN VMs 340 or a resource allocated to the vRAN VM 340, the scaling VM 350 may deliver a command therefor to the hypervisor 330. Also, the scaling VM 350 may deliver updated vRAN package information to an O&M 360.

Figure 4A:
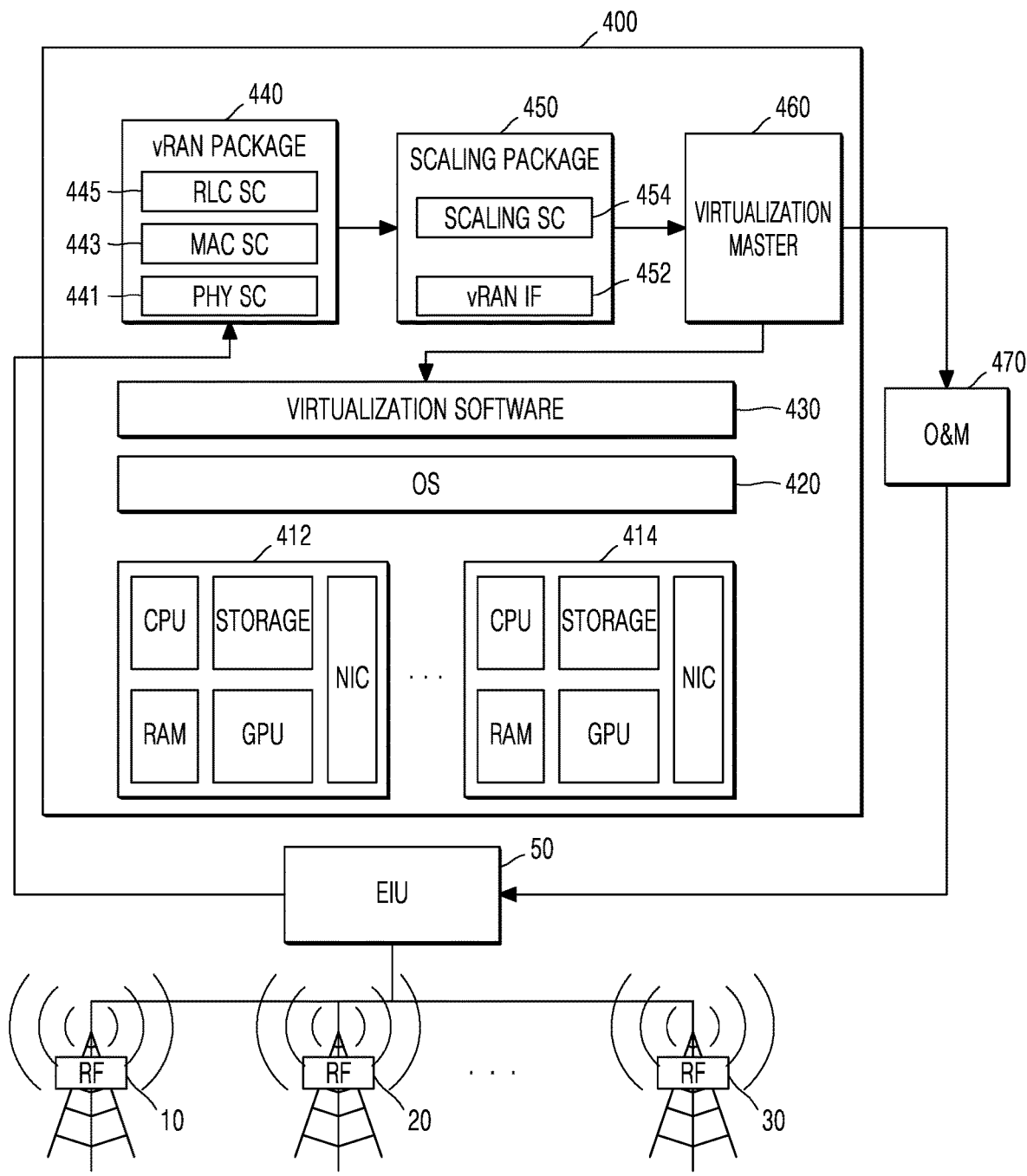
FIG. 4A is a diagram illustrating example resource allocation for traffic processing by a virtualized RAN (vRAN), according to an embodiment of the disclosure.

FIG. 4A is a diagram for describing resource allocation for traffic processing by a vRAN, according to an example embodiment of the disclosure.

Referring to FIG. 4A, a server 400 may include a plurality of items of hardware 412 and 414 capable of driving software for performing a vRAN function. Each of the plurality of items of hardware 412 and 414 may include a CPU, a RAM, a storage, a GPU, and a NIC, but this is merely an example, and elements of the hardware are not limited thereto.

An OS 420 may manage hardware (e.g., the hardware 412) and software (e.g., virtualization software 430) executed in the server 400.

The virtualization software 430 may integrate and manage the plurality of items of hardware 412 and 414 so as to process traffic. The virtualization software 430 may be stored in hardware (e.g., the hardware 412) in which a vRAN package 440 is stored, or may be stored in hardware (e.g., the hardware 414) in which the vRAN package 440 is not stored.

Hereinafter, a method of allocating resources of the plurality of items of hardware 412 and 414 to the vRAN package 440 so as to process traffic of the plurality of BSs 10, 20, and 30 will be described in detail. A CPU included in each of the plurality of items of hardware 412 and 414 may have 20 cores, a RAM may have a capacity of 512 gigabytes (GB), and a storage may have a capacity of 1 terabytes (TB), for example.

According to an embodiment of the disclosure, 10 cores from among all cores, 50 GB of RAM, and 500 GB of storage may be allocated to the vRAN package 440, according to initial setting, for example. For example, 4 cores of the 10 cores may be allocated to a RLC SC 445, 3 cores may be allocated to a MAC SC 443, and 3 cores may be allocated to a PHY SC 441. 20 GB of 50 GB of RAM may be allocated to the RLC SC 445, 15 GB may be allocated to the MAC SC 443, and 15 GB may be allocated to the PHY SC 441. Also, 200 GB of 500 GB of storage may be allocated to the RLC SC 445, 150 GB may be allocated to the MAC SC 443, and 150 GB may be allocated to the PHY SC 441, for example.

The vRAN package 440 may process traffic occurred in the plurality of BSs 10, 20, and 30, based on the allocated resource. Also, the vRAN package 440 may deliver traffic processing information to a vRAN IF 452.

The vRAN IF 452 may deliver the traffic processing information to a scaling SC 454. The scaling SC 454 may obtain, based on the traffic processing information, information about traffic to occur in the plurality of BSs 10, 20, and 30. According to an example embodiment of the disclosure, the scaling SC 454 may obtain information about traffic to occur in a target prediction time, based on information about traffic previously occurred in a situation similar to the target prediction time and information about a resource used to process the occurred traffic. For example, when the target prediction time is an office-going hour, the scaling SC 454 may confirm that traffic previously occurred in the plurality of BSs 10, 20, and 30 in the office-going hour was 200 GBps, and a resource to process the traffic was 20 CPU cores and 200 GB of RAM.

Because 10 CPU cores and 200 GB of RAM which are current resources allocated to the vRAN package 440 may be insufficient for resources needed for processing the traffic, the scaling SC 454 may determine to increase a resource to be allocated to the vRAN package 440, and/or to additionally generate a vRAN package. For example, when a size of a resource that is additionally required is smaller than a preset threshold value, the scaling SC 454 may determine to perform scale up to increase the resource to be allocated to the vRAN package 440. In this case, the scaling SC 454 may request a virtualization master 460 for scale up of the vRAN package 440. Because the scale up request is received from the scaling SC 454, the virtualization master 460 may deliver a scale up command to the virtualization software 430. In response to the scale up command, the virtualization software 430 may increase the resource to be allocated to the vRAN package 440.

As another example, when the size of the resource that is additionally required is equal to or greater than the preset threshold value, the scaling SC 454 may determine to perform scale out to additionally generate the vRAN package 440. In this case, the scaling SC 454 may request the virtualization master 460 for scale out of the vRAN package 440. Because the scale out request is received from the scaling SC 454, the virtualization master 460 may deliver a scale out command to the virtualization software 430.

In response to the scale out command, the virtualization software 430 may additionally generate the vRAN package 440, and may allocate a resource to the additionally generated vRAN package 440. According to an example embodiment of the disclosure, the virtualization software 430 may perform resource pinning of configuring a dedicated resource for each vRAN package. The resource pinning according to the disclosure indicates a resource allocation method of allocating a dedicated resource to each system for performing a particular process. The resource pinning may include CPU pinning, or the like.

When the CPU pinning is applied, the plurality of items of hardware 412 and 414 may have a Non-Uniform Memory Access (NUMA) structure in which an independent memory is allocated to each CPU. For example, when the CPU pinning is applied, first to tenth cores may be allocated to the vRAN package 440, and a memory grouped with the first to tenth cores may be allocated thereto. In this regard, a CPU core and a memory grouped with the CPU core may be described as a NUMA node. When the first to tenth cores are allocated to the vRAN package 440, and then a vRAN package is additionally generated, the virtualization software 430 may allocate a core other than the first to tenth cores to the vRAN package that is additionally generated. The vRAN package 440 may process traffic by using the CPU core and the memory grouped as the NUMA node, thereby increasing a traffic processing speed. Also, the virtualization software 430 may allocate the CPU core and the memory grouped as the NUMA node to the additionally generated vRAN package, thereby increasing a traffic processing speed. When the CPU core processes the traffic by accessing a memory grouped with another NUMA node, the traffic processing speed may be decreased. However, this is merely an example, and a method by which the virtualization software 430 allocates a resource to the vRAN package 440 is not limited thereto. In another example embodiment of the disclosure, when a vRAN package is additionally generated, the virtualization software 430 may allocate at least some portions of a resource to the additionally generated vRAN package, the resource having been allocated to the vRAN package 440, and may allocate another resource to the vRAN package 440.

Also, the virtualization master 460 may notify an O&M 470 of the additional generation of the vRAN package. Based on the additionally generated vRAN package, the O&M 470 may command the EIU 50 to allocate traffic occurring in the plurality of BSs 10, 20, and 30. Accordingly, traffic received from at least one of the plurality of BSs 10, 20, and 30 may be allocated to the additionally generated vRAN package.

Figure 4B:
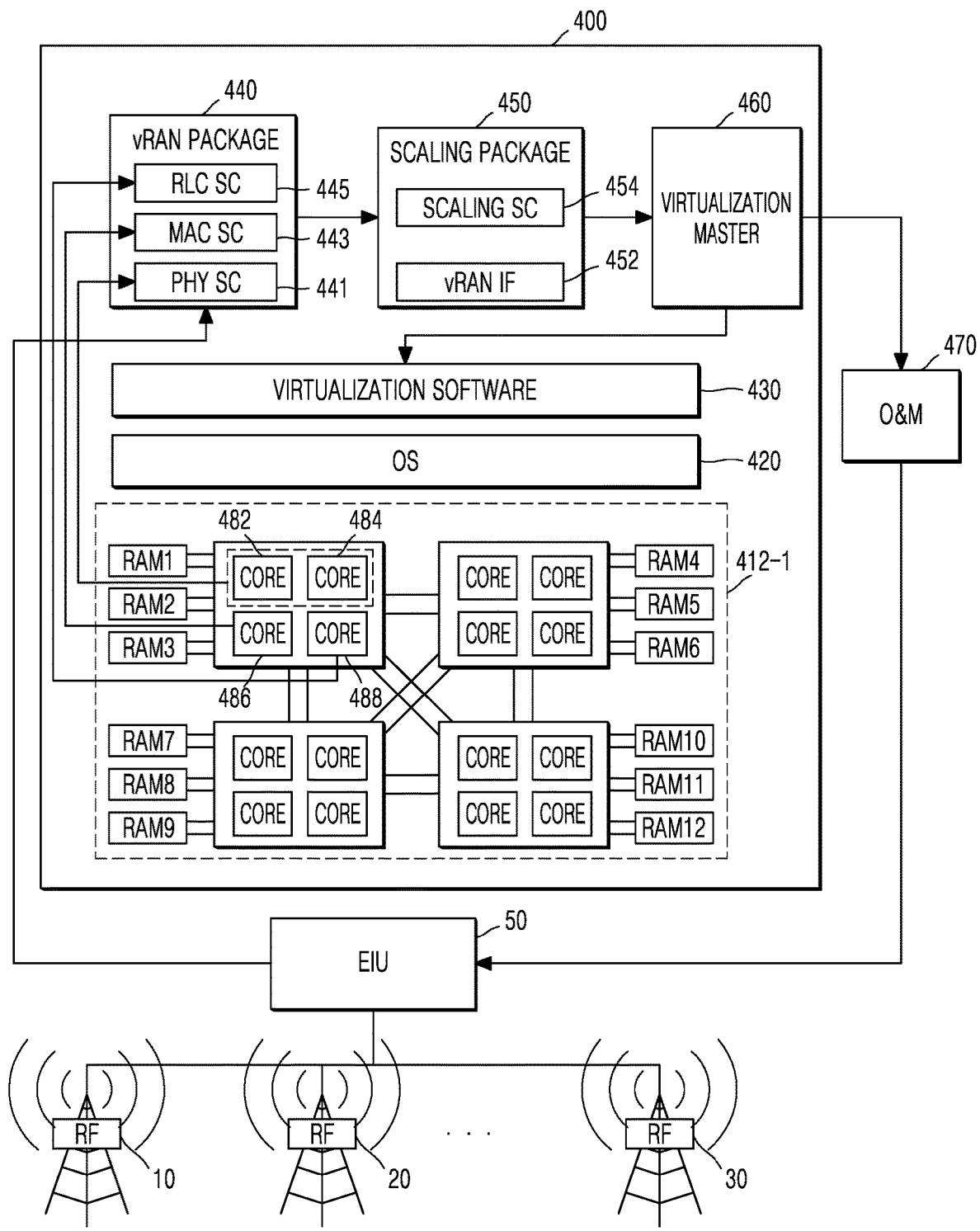
FIG. 4B is a diagram illustrating an example method of performing central processing unit (CPU) pinning during resource allocation for traffic processing by a vRAN, according to an embodiment of the disclosure.

FIG. 4B is a diagram for describing a method of performing CPU pinning during resource allocation for traffic processing by a vRAN, according to an embodiment of the disclosure.

Referring to FIG. 4B, according to an example embodiment of the disclosure, a detailed structure 412-1 of the CPU and the RAM of the hardware 412 from among the plurality of items of hardware 412 and 414 of the server 400 described above with reference to FIG. 4A is illustrated. The first hardware 412 may include the storage, the GPU, and the NIC, in addition to the CPU and the RAM, but for convenience of description, elements other than the CPU and the RAM are not illustrated. In addition, descriptions about elements of FIG. 4B which correspond to those of FIG. 4A are not provided.

The virtualization software 430 according to an example embodiment of the disclosure may perform resource pinning of allocating a dedicated resource to performing of a particular RAN function. For example, the virtualization software 430 may perform CPU pinning of allocating at least some cores and a RAM connected to the at least some cores to perform a RAN function, the at least some cores being from among cores included in the CPU.

When CPU pinning is applied, the CPU may have a NUMA structure in which an independent memory is allocated to the cores included in the CPU. For example, when CPU pinning is applied, a first core 482 and a second core 484 and RAM areas (e.g., RAM 1 and RAM 2) grouped with the first and second cores 482 and 484 may be allocated to the PHY SC 441 included in the vRAN package 440. Also, a third core 486 and a RAM grouped with the third core 486 may be allocated to the MAC SC 443 included in the vRAN package 440. Also, a fourth core 488 and a RAM grouped with the fourth core 488 may be allocated to the RLC SC 445 included in the vRAN package 440.

Each of the PHY SC 441, the MAC SC 443, and the RLC SC 445 may process traffic by using a dedicated CPU core and a memory that are grouped as a NUMA node, thereby increasing a traffic processing speed. Also, the virtualization software 430 may allocate, to an additionally generated vRAN package, a CPU core and a memory that are grouped as a NUMA node, thereby increasing a traffic processing speed.

Figure 4C:
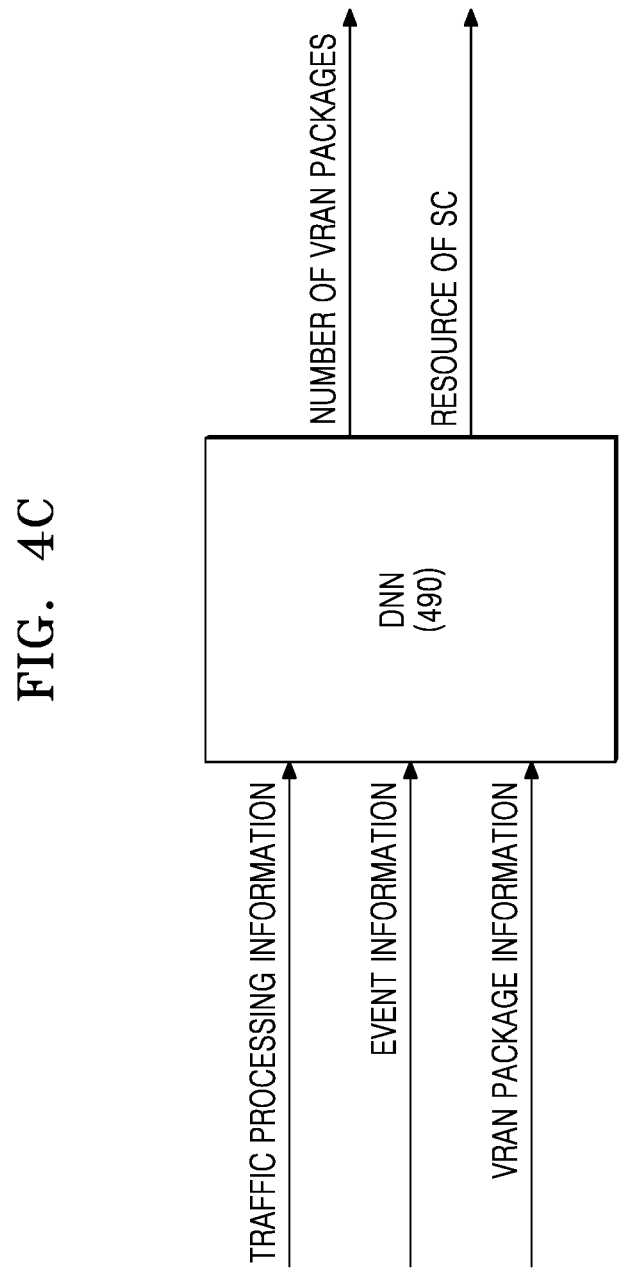
FIG. 4C is a diagram illustrating an example method, performed by a vRAN, of adjusting the number of vRAN packages and a resource of a software component (SC) using a pre-generated artificial intelligence (AI) model, according to an embodiment of the disclosure.

FIG. 4C is a diagram for describing a method, performed by a vRAN, of adjusting the number of vRAN packages and a resource of a SC by using a pre-generated artificial intelligence (AI) model, according to an example embodiment of the disclosure.

Each of components described in an embodiment of FIG. 4C may correspond to elements described above with reference to FIGS. 4A and 4B, for example.

A vRAN IF according to an example embodiment of the disclosure may transmit traffic processing information and event information to a scaling SC (e.g., 254, 355, and/or 454). The scaling SC according to an embodiment of the disclosure may determine, by using a pre-generated AI model 490, the number of vRAN packages and a resource of a SC for processing traffic to occur at a later time, based on the number of current vRAN packages and a resource allocated to each SC of a vRAN package, and the traffic processing information and the event information that are obtained from the vRAN IF. In the present example embodiment of the disclosure, for convenience of description, the number of current vRAN packages and a resource allocated to each SC of a vRAN package are referred to as vRAN package information.

The AI model 490 denotes an artificial neural network model simulating a neural network of a human brain, and is not limited to an artificial neural network model using a particular algorithm. The AI model 490 may be stored in a CPU of hardware 490 but this is merely an example and thus the AI model 490 may be stored in an external server.

For training of the AI model 490 used in the embodiment of FIG. 4C, input data and output data as in Table 1 below may be used.

TABLE 1

Input/output data when the number of vRAN
packages and a resource of a SC are adjusted

| Input data | Output data |
|---|---|
| (1) traffic processing information | (1) the number of vRAN packages |
| (2) event information | (2) resource of SC |
| (3) vRAN package information | |

The input data denotes data applied to input nodes of layers constituting a neural network of an AI model. The input data according to an example embodiment of the disclosure may include the traffic processing information, the event information, and the vRAN package information. Also, the output data may be obtained as a result of applying the input data to the trained AI model. The output data may include the number of vRAN packages, a resource of a SC, and a mode of a BS. A parameter denotes a value used in a calculation process of each of the layers constituting the neural network of the AI model, and may include a weight to be used in applying an input value to a preset calculation formula. Also, the parameter may be a value set as a result of training, and the value of the parameter may be modified and refined based on the input data of the AI model. For example, when the AI model has been trained through supervised learning, the parameter of the AI model may be trained by comparing the output data with preset evaluation data, the output data being obtained as a result of applying the input data to the AI model.

The scaling SC may determine, by using the AI model, the number of vRAN packages and a resource of a SC for processing traffic to occur at a later time. For example, the scaling SC may obtain, by using the AI model, output data indicating in an increase of the number of vRAN packages to A.

In this case, the scaling SC may request a virtualization master for scale out of the vRAN packages. When the virtualization master receives a scale out request from the scaling SC, the virtualization master may transmit a scale out command to virtualization software. The virtualization software may increase the number of the vRAN packages, in response to the scale out command.

In addition, the virtualization master may notify an O&M of an additional generation of the vRAN package. Based on the additionally generated vRAN package, the O&M may command an EIU to allocate traffic occurring in a plurality of BSs. Accordingly, traffic received from at least one of the plurality of BSs may be allocated to the additionally generated vRAN package.

Figure 5:
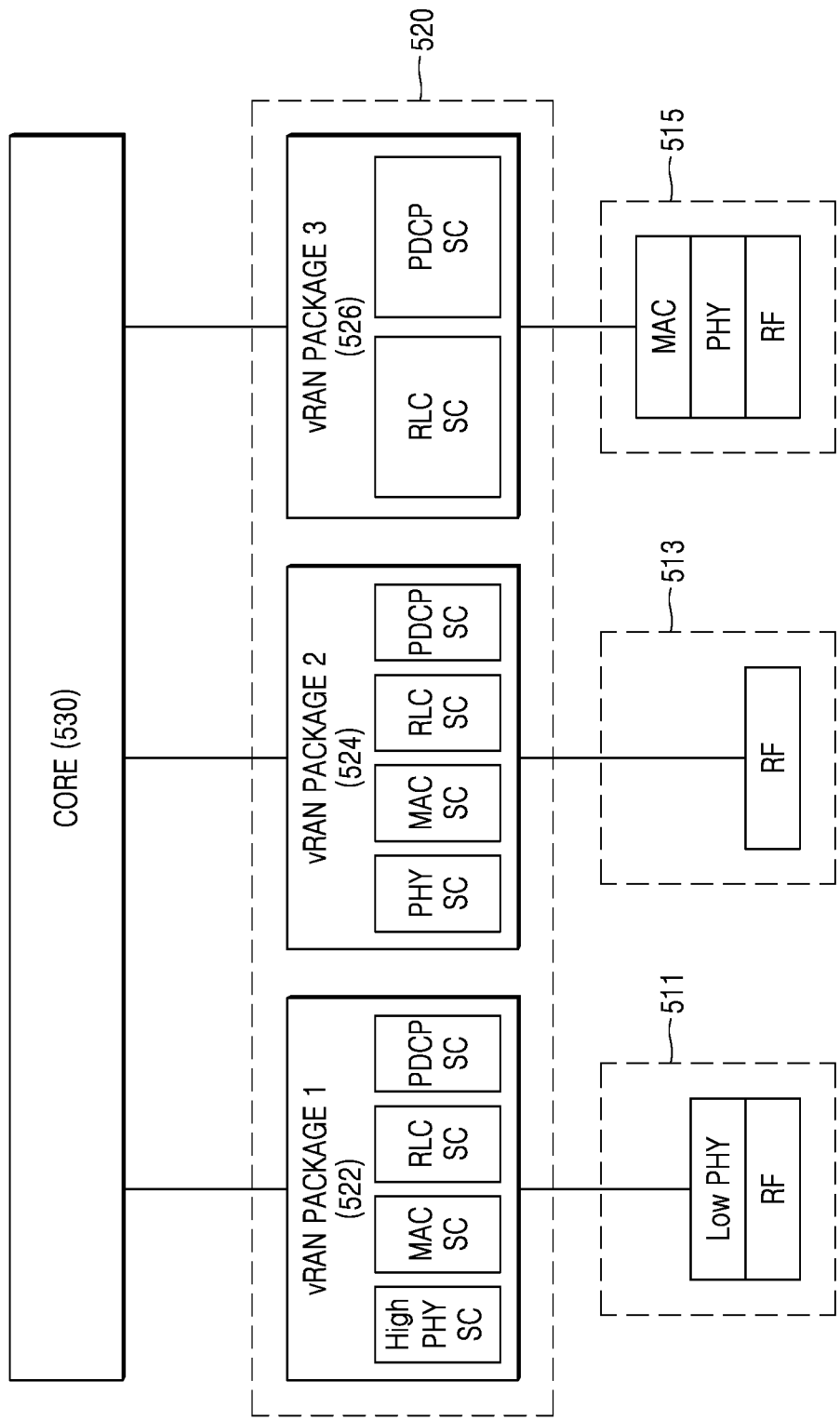
FIG. 5 is a diagram illustrating an example RAN function that may be performed in a server, according to an embodiment of the disclosure.

FIG. 5 is a diagram for describing a RAN function that may be performed in a server 520, according to an example embodiment of the disclosure.

Referring to FIG. 5, a SC configured to perform at least some functions among RAN functions used to be performed by an integrated BS according to the related art may be executed in the server 520. In this regard, the RAN functions may include a PHY layer function, a MAC layer function, a RLC layer function, a PDCP layer function, or the like, and in particular, the PHY layer function may be further divided into a low PHY layer function and a high PHY layer function. However, this is merely an example, and other layer functions may also be further divided.

A dividing time point of the RAN functions may be determined based on an amount of traffic processable by the server 520, a capability of a fronthaul connecting a BS 511 (also referred to as the first BS 511) to the server 520, a capability of a backhaul connecting the server 520 to a core network device(s) 530, or the like, In a vRAN according to an embodiment of the disclosure, when an amount of traffic occurring in a base station (e.g., the base station 511) of a cell site is greater than a traffic capacity of the fronthaul connecting the base station (e.g., the base station 511) of the cell site to the server 520, a delay or loss may occur due to congestion on the fronthaul while traffic is delivered to the server 520. In this case, unlike to the embodiment of the disclosure described above with reference to FIG. 2, to decrease a load of the fronthaul, the PHY layer function may be divided, and thus, the low PHY layer function may be executed in the first BS 511 of the cell site. Accordingly, a vRAN package 1 (522) including a high PHY SC performing the high PHY layer function, a MAC SC performing the MAC layer function, a RLC SC performing the RLC layer function, and a PDCP SC performing the PDCP layer function may be executed in the server 520. The server 520 may of course include at least one processor, including circuitry, for such execution.

According to another example embodiment of the disclosure, in the vRAN, when the traffic capacity of the fronthaul is greater than an amount of traffic actually occurring in the BS 511, and traffic processing capability of the server 520 is equal to or greater than a certain level, a vRAN package 2 524 including a PHY SC performing the PHY layer function, a MAC SC performing the MAC layer function, a RLC SC performing the RLC layer function, and a PDCP SC performing the PDCP layer function may be executed in the server 520. In this case, a RF entity may be included in a second BS 513 of the cell site.

According to another example embodiment of the disclosure, when the traffic capacity of the fronthaul is very low in the vRAN, a vRAN package 3 526 including a RLC SC performing the RLC layer function and a PDCP SC performing the PDCP layer function may be executed in the server 520. In this case, a RF entity, an entity for performing the PHY layer function, and an entity for performing the MAC layer function may be included in a third BS 515 of the cell site, and in this example embodiment of the disclosure, relatively many RAN functions are performed in the third BS 515 of the cell site, and thus, the load of the fronthaul may be decreased.

With respect to various vRAN package structures described with reference to FIG. 5, scaling operations according to an embodiment(s) of the disclosure described with reference to FIGS. 2 to 4 may be applied. Also, at least one of hardware elements or software elements of FIGS. 2 to 4 which are to perform the scaling operations may be equally applied to the various vRAN package structures according to this example embodiment of the disclosure.

Figure 6:
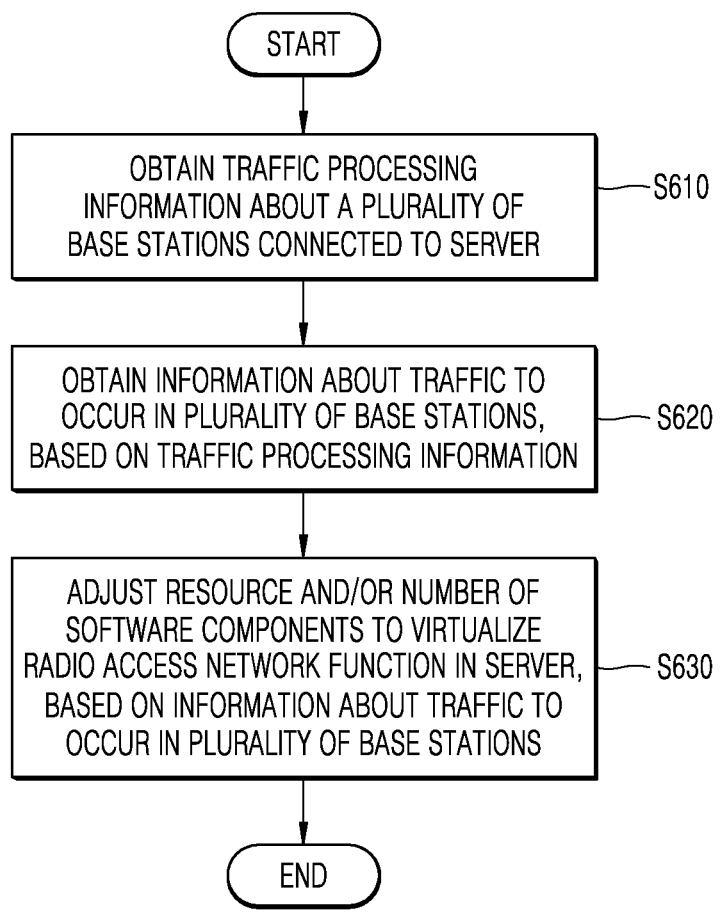
FIG. 6 is a flowchart illustrating an example method of adjusting, by a server, a software component (SC) based on information about traffic to occur in a plurality of base stations (BSs), according to an embodiment of the disclosure.

FIG. 6 is a flowchart for describing a method of adjusting, by a server (e.g., see the servers in FIGS. 2-5), an SC (e.g., see the SCs in FIGS. 2-5) based on information about traffic to occur in a plurality of BSs, according to an embodiment of the disclosure.

In operation S610, the server may obtain traffic processing information about the plurality of BSs connected to the server. According to an embodiment of the disclosure, traffic refers to a data flow passing through a communication network between the plurality of BSs and UEs that respectively access the plurality of BSs. For example, the traffic may be indicated as a data transmission rate per unit time. Also, the traffic processing information may include traffic information about traffic occurred in a plurality of BSs, and resource information about a resource used in processing the traffic.

The server according to an example embodiment of the disclosure may identify, from the traffic processing information, information of an amount of traffic occurred according to each of at least one time period. For example, the server may identify an amount of traffic which occurred one week ago or an amount of traffic which occurred 10 minutes ago. As another example, the server may identify, from the traffic processing information, an amount of traffic which occurred in the plurality of BSs, according to each of wireless communication systems, and as another example, the server may identify an amount of traffic which occurred in the plurality of BSs, according to each of time-frequency resource domains.

However, this is merely an example, and as another example, the server may identify, from the traffic processing information, a resource used in processing traffic. For example, the server may identify a RAM capacity, the number of CPU cores, or the like which are used to process particular traffic.

The server according to an example embodiment of the disclosure may request the plurality of BSs for traffic processing information so as to receive the traffic processing information. As another example, the server may periodically receive traffic processing information from the plurality of BSs, without a request for the traffic processing information. The server according to another embodiment of the disclosure may receive traffic processing information from a core network device. The server according to another embodiment of the disclosure may generate traffic processing information, based on information collected when traffic is previously processed in a vRAN package. However, this is merely an example, and a method by which the server obtains traffic processing information is not limited thereto. As another example, the server may directly receive an input of traffic processing information from a user.

In operation S620, the server may obtain information about traffic to occur in the plurality of BSs, based on the traffic processing information.

The server according to an example embodiment of the disclosure may identify a pattern of the traffic occurred in the plurality of BSs, based on the received traffic processing information. The traffic pattern indicates types of a change in an amount of the traffic according to locations and time. The server may identify a pattern of an amount of traffic occurred in each of time-frequency resource domains, based on the traffic processing information. For example, the traffic pattern may include an average value, a maximum value, and a minimum value of the amount of the traffic, according to each preset time unit or each location. Also, the traffic pattern may indicate a change in the number of accesses and an access time of a UE, according to locations and time. Table 1 below shows average values of an amount of traffic, according to each preset time unit and each location.

TABLE 1

<Average values (Gbps) of amount of traffic, according to each location and each time unit>

| Location | Time | | | | | |
|---|---|---|---|---|---|---|
| | 6-9 | 9-12 | 12-15 | 15-18 | 18-21 | 21-24 |
| BS A | 10,343 | 10,285 | 7,564 | 8,129 | 27,486 | 25,316 |
| BS B | 7,287 | 2,614 | 375 | 572 | 24,259 | 22,810 |
| BS C | 140 | 30,112 | 28,311 | 40,488 | 14,792 | 914 |
| BS D | 384 | 601 | 1460 | 2349 | 3714 | 2,377 |

As another example, the traffic pattern may indicate a change in an amount of traffic, according to occurrence of an event. The server may identify a change in the amount of traffic at a time point of occurrence of an event. For example, when a football match/game is scheduled, the server may identify that traffic increases by three times one hour before a start time of the football match.

As another example, the server may identify a traffic pattern according to each of frequency resource domains and each of service types. The frequency resource domains may be classified, according to types of a wireless communication system. For example, the frequency resource domains may be classified to a frequency resource domain for LTE and a frequency resource domain for NR. Also, the service types may be classified, according to target capabilities aimed by services. For example, the service types may be classified to URLLC, MMTC, eMBB, or the like, according to the target capabilities including latency, connectivity, a throughput, or the like. However, this is merely an example, and the frequency resource domains and the service types are not limited thereto.

The server may identify the traffic pattern by using a pre-generated artificial intelligence (AI) model. The pre-generated AI model may be configured of at least one layer, and a parameter of each of nodes included in the at least one layer may be configured through training based on the traffic processing information, event information, or the like.

The server according to an example embodiment of the disclosure may obtain the information about the traffic to occur in the plurality of BSs, based on the identified traffic pattern. The server may predict an amount of traffic to increase or decrease by at least a threshold value at a particular time. For example, the server may predict, based on the identified traffic pattern, an amount of traffic to increase by at least a threshold value in an office-going hour. Also, the server may obtain the information about the traffic to occur in the plurality of BSs, by combining amounts of traffic occurred according to respective time periods. For example, the server may determine a traffic flow indicating that traffic increases by two times, based on information of an amount of traffic occurred a week ago, and may obtain traffic information indicating that an amount of traffic to occur in the plurality of BSs to be 2A, based on A that is an amount of traffic occurred 10 minutes ago.

According to another embodiment of the disclosure, the server may obtain traffic information about a case in which a particular event occurs, based on the identified traffic pattern. For example, the server may obtain traffic information indicating that an amount of traffic is to increase by at least a threshold value when a football match is scheduled.

As another example, the server may predict, based on the identified traffic pattern, an amount of traffic to increase or decrease by at least a threshold value at a particular time according to each service type or each frequency resource domain. The prediction about traffic will be described below with reference to FIGS. 9A to 10B.

In operation S630, the server may adjust a resource or the number of SCs to virtualize a RAN function in the server, based on the information about the traffic to occur in the plurality of BSs.

An operation of virtualizing the RAN function indicates an operation of virtualizing the RAN function as software, the RAN function being used to be performed by an existing dedicated hardware device. In this regard, the RAN function may correspond to the descriptions provided with reference to any above figure.

According to an example embodiment of the disclosure, the server may determine that traffic is to increase by at least a threshold value in a t1-t2 period, based on a result of the prediction, and thus may increase the number of the SCs before a t1 time. An operation of increasing the number of the SCs may be performed in a unit of the aforementioned vRAN package, but this is merely an example, and the operation of increasing the number of the SCs may not be performed in the unit of the vRAN package. For example, a PHY SC, a MAC SC, a RLC SC, a PDCP SC, or the like may each be generated or removed.

The operation of increasing the number of the SCs may be described as scale-out. When the server determines, based on the result of the prediction, that the traffic is to decrease by at least a threshold value after a t2 time, the server may decrease the number of the SCs after the t2 time. An operation of decreasing the number of the SCs may also be performed in the unit of the aforementioned vRAN package, but this is merely an example, and the operation of decreasing the number of the SCs may not be performed in the unit of the vRAN package. The operation of decreasing the number of the SCs may be described as scale-in.

A layer function to which a load is added to process traffic may vary, the traffic having occurred according to each service type or each frequency domain. For example, when traffic of URLLC is increased, a resource scheduling period is short, and thus it may be predicted that a load of a SC to perform a MAC layer function is to be large. As another example, when traffic increases in an NR frequency domain, it may be predicted that a load of a SC to perform a PHY layer function is to be large. In this case, the server may increase a resource of a SC to perform a particular layer function. For example, the resource may include a CPU, a GPU, a RAM, and a storage, but this is merely an example, and examples of the resource are not limited thereto. The server may adjust the resource by increasing or decreasing an amount of the resource allocated to the SC. In the disclosure, an operation of increasing the resource allocated to the SC may be described as scale-up.

The server may decrease a resource of a SC to perform a particular layer function. An operation of decreasing the resource allocated to the SC may be described as scale-down.

According to an example embodiment of the disclosure, the server may predict a change in traffic. Based on the prediction, the server may adjust, before the change in the traffic, the number or a resource of a SC to correspond to the traffic to be changed, the SC performing a RAN function, such that it is possible to efficiently use resources of the server. However, this is merely an example, and the server may adjust both the number and the resource of the SC.

Figure 7:
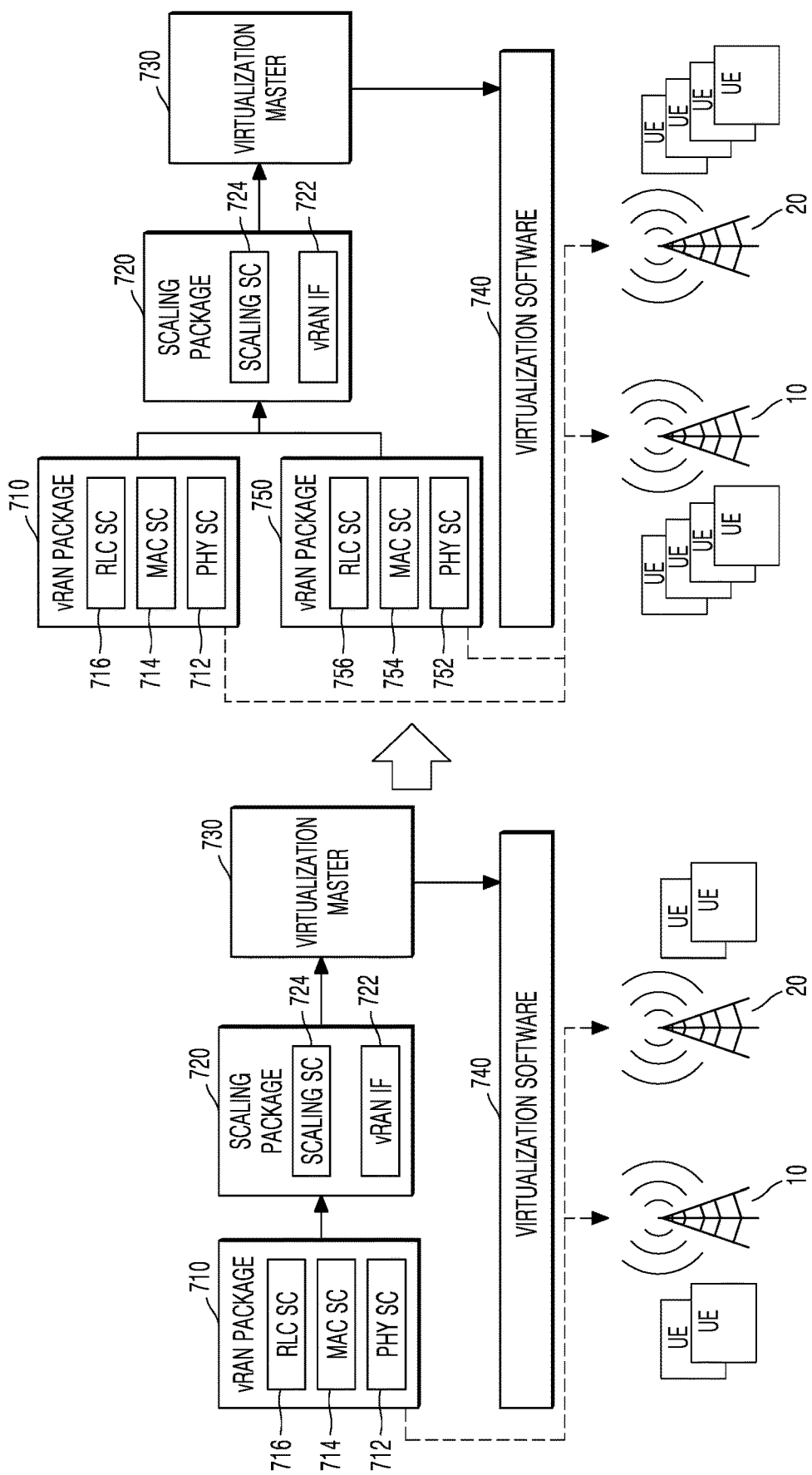
FIG. 7 is a diagram illustrating an example method of adjusting, by a server, the number of SCs when traffic information indicating an increase in traffic is received, according to an embodiment of the disclosure.

FIG. 7 is a diagram for describing a method of adjusting, by a server, the number of SCs when traffic information indicating an increase (e.g., actual or predicted increase) in traffic is received, according to an example embodiment of the disclosure.

Referring to FIG. 7, the server according to an example embodiment of the disclosure may drive software for performing a vRAN function through hardware included in the server. In particular, an OS may be driven in the hardware, and may manage the hardware and virtualization software 740 that is executed in the server. Because descriptions of the hardware, the OS, and the virtualization software are the same as those provided with reference to FIG. 2 (see also FIGS. 3-4), further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

Traffic occurred in a plurality of BSs 10 and 20 may be delivered to a vRAN package 710. The BSs 10 and 20 may also be referred to as the first and second BSs 10 and 20. A PHY SC 712, a MAC SC 714, and a RLC SC 716 included in the vRAN package 710 may respectively perform a PHY layer function, a MAC layer function, and a RLC layer function on/for the delivered traffic.

According to an embodiment of the disclosure, a scaling package 720 may include a vRAN IF 722 and a scaling SC 724. The vRAN IF 722 may receive traffic information about the traffic of the plurality of BSs 10 and 20, the traffic being delivered to the vRAN package 710. Also, the vRAN IF 722 may receive information about a resource allocated to the vRAN package 710 so as to process the delivered traffic.

The scaling SC 724 may obtain information about traffic to occur in the plurality of BSs 10 and 20, based on the traffic information received via the vRAN IF 722. For example, the scaling SC 724 may identify a pattern of the traffic occurred in the plurality of BSs 10 and 20, based on traffic processing information, and thus may predict, based on a result of the identifying, that an amount of traffic to occur in one or more of the plurality of BSs 10 and 20 would increase by at least a first threshold value due to an increase in UEs accessing the plurality of BSs 10 and 20 in the t1-t2 period.

Also, the scaling SC 724 may identify resource information from the traffic processing information, the resource information being used in processing pre-occurred traffic. For example, the scaling SC 724 may identify that 5 CPU cores and 50 GB of a RAM memory were used to process traffic A Gbps that previously occurred. Based on the information, when an amount of traffic increases in the t1-t2 period by at least the first threshold value, the scaling SC 724 may identify an amount of a resource that is additionally requested to process the traffic. For example, because the amount of the traffic increases in the t1-t2 period by at least the first threshold value, the scaling SC 724 may identify that 10 CPU cores and 100 GB of the RAM memory are requested to process the traffic.

When traffic increases, a time taken to process the traffic may increase due to an increase in a CPU capacity and a memory capacity of the vRAN package 710 which were previously configured, and such increase in the time may cause a decrease in throughput of the vRAN package 710. According to an example embodiment of the disclosure, to prevent/reduce the decrease in throughput, the scaling SC 724 may deliver a scale-out command to a virtualization master 730 so as to increase the number of vRAN packages for the t1-t2 period in which traffic is predicted to increase. The virtualization master 730 may deliver the scale-out command to the virtualization software 740, and may update and store vRAN package information that is changed in response to the scale-out command. In response to the scale-out command, the virtualization software 740 may generate a new vRAN package 750 and may allocate a resource to the new vRAN package 750.

The virtualization master 730 may deliver information about the new vRAN package 750 to O&M (not shown). In consideration of the new vRAN package 750, the O&M may determine a vRAN package to process the traffic to occur in the plurality of BSs 10 and 20. For example, traffic of the first BS 10 may be determined to be processed by the existing vRAN package 710, and traffic of the second BS 20 may be determined to be processed by the new vRAN package 750. According to the determination, the O&M may command an EIU (not shown) to allocate the traffic to occur in the plurality of BSs 10 and 20 to each of vRAN packages. Accordingly, the existing vRAN package 710 and the new vRAN package 750 process the traffic, such that the decrease in throughput may be prevented/reduced.

Figure 8:
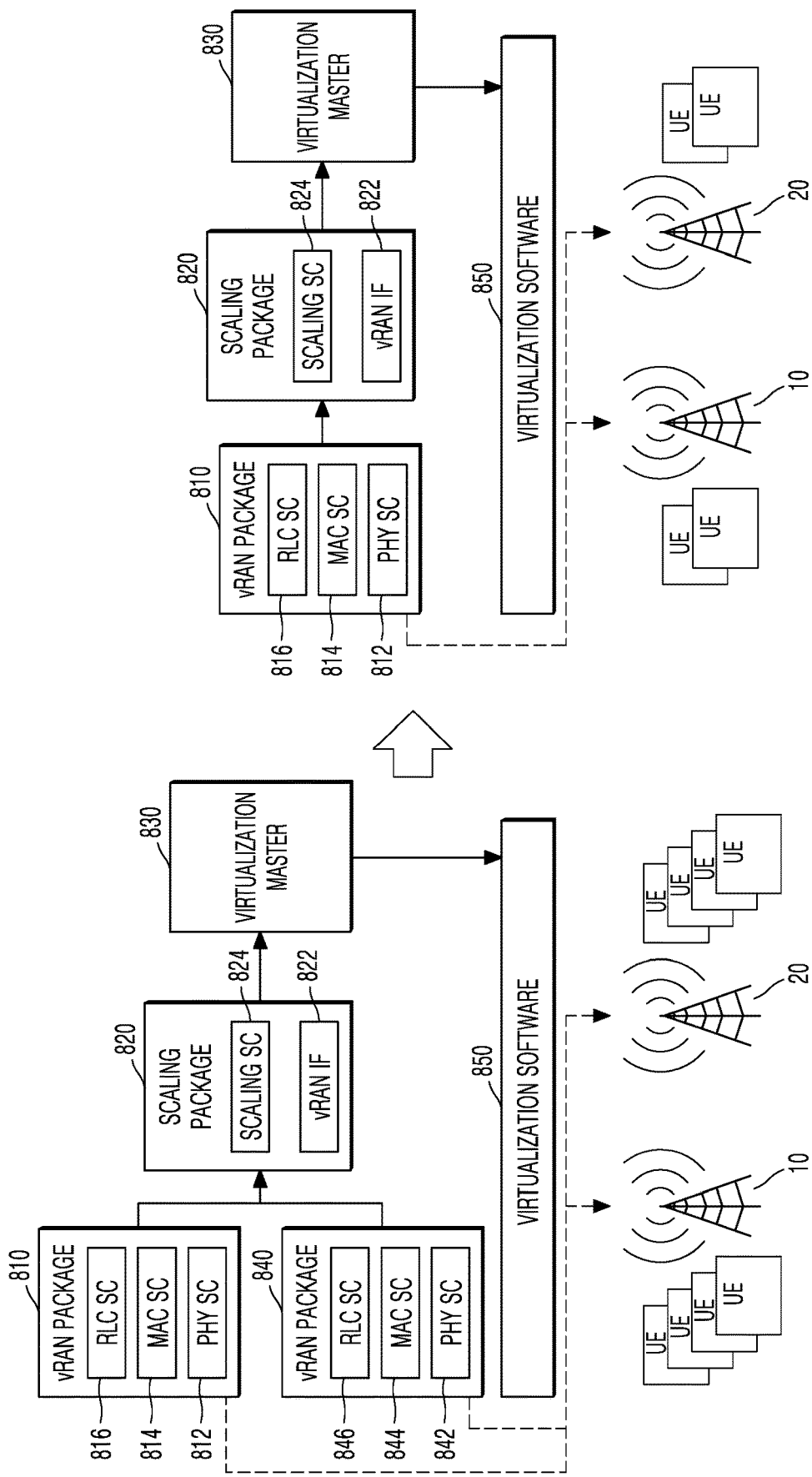
FIG. 8 is a diagram illustrating an example method of adjusting, by a server, the number of SCs when traffic information indicating a decrease in traffic is received, according to an embodiment of the disclosure.

FIG. 8 is a diagram for describing a method of adjusting, by a server, the number of SCs when traffic information indicating a decrease in traffic is received, according to an example embodiment of the disclosure.

Referring to FIG. 8, the server according to an example embodiment of the disclosure may drive software for performing a vRAN function through hardware included in the server. In particular, an OS may be driven in the hardware, and may manage the hardware and virtualization software that is executed in the server. Because descriptions of the hardware, the OS, and the virtualization software are the same as those provided with reference to FIGS. 2-4, further descriptions are not provided here.

Hereinafter, to describe an example method of decreasing, by the server, a vRAN package when a decrease in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

Traffic occurred in the plurality of BSs 10 and 20 may be delivered to a plurality of vRAN packages 810 and 840 (also referred to as the first and second vRAN packages 810 and 840). For example, the first vRAN package 810 may receive traffic occurred in the first BS 10, and the second vRAN package 840 may receive traffic occurred in the second BS 20. PHY SCs 812 and 842, MAC SCs 814 and 844, and RLC SCs 816 and 846 respectively included in the plurality of vRAN packages 810 and 840 may each perform a PHY layer function, a MAC layer function, and a RLC layer function on the delivered traffic.

According to an example embodiment of the disclosure, a scaling package 820 may include a vRAN IF 822 and a scaling SC 824. The vRAN IF 822 may receive traffic information about the traffic of the plurality of BSs 10 and 20, the traffic being delivered to the plurality of vRAN packages 810 and 840. Also, the vRAN IF 822 may receive information about a resource allocated to the plurality of vRAN packages 810 and 840 so as to process the delivered traffic.

The scaling SC 824 may obtain information about traffic to occur in the plurality of BSs 10 and 20, based on the traffic information received via the vRAN IF 822. For example, the scaling SC 824 may identify the traffic occurred in the plurality of BSs 10 and 20, based on traffic processing information, and thus may predict, based on a result of the identifying, that an amount of traffic to occur in the plurality of BSs 10 and 20 would decrease by at least a second threshold value due to a decrease in UEs accessing the plurality of BSs 10 and 20 in a t3-t4 period.

When traffic decreases, traffic processing may be available without deterioration in preset capabilities of the first vRAN package 810 and the second vRAN package 840, but, because traffic that is processable by one vRAN package is processed by the plurality of vRAN packages 810 and 840, a resource such as a CPU, a memory, a GPU, or the like allocated to a vRAN package may be wasted. Accordingly, when the scaling SC 824 determines that traffic processing may be available in the t3-t4 period by one vRAN package without capability deterioration, the scaling SC 824 may deliver a scale-in command to a virtualization master 830 so as to control one of the first vRAN package 810 and the second vRAN package 840 to be removed at a t3 time or within a certain time from the t3 time. The virtualization master 830 may deliver the scale-in command to virtualization software 850, and may update and store vRAN package information that is changed in response to the scale-in command. In response to the scale-in command, the virtualization software 850 may remove the second vRAN package 840 from among the plurality of vRAN packages 810 and 840.

The virtualization master 830 may deliver information about the removed second vRAN package 840 to O&M (not shown). In consideration of the removed second vRAN package 840, the O&M may determine a vRAN package to process the traffic to occur in the plurality of BSs 10 and 20. For example, the traffic of the plurality of BSs 10 and 20 may be determined to be processed by the first vRAN package 810. According to the determination, the O&M may command an EIU (not shown) to allocate the traffic to occur in the plurality of BSs 10 and 20 to each of vRAN packages. Accordingly, according to an embodiment of the disclosure, the scaling package 820 may decrease the number of vRAN packages in a traffic decrease period and thus may prevent/reduce a resource of the server from being unnecessarily wasted.

Figure 9A:
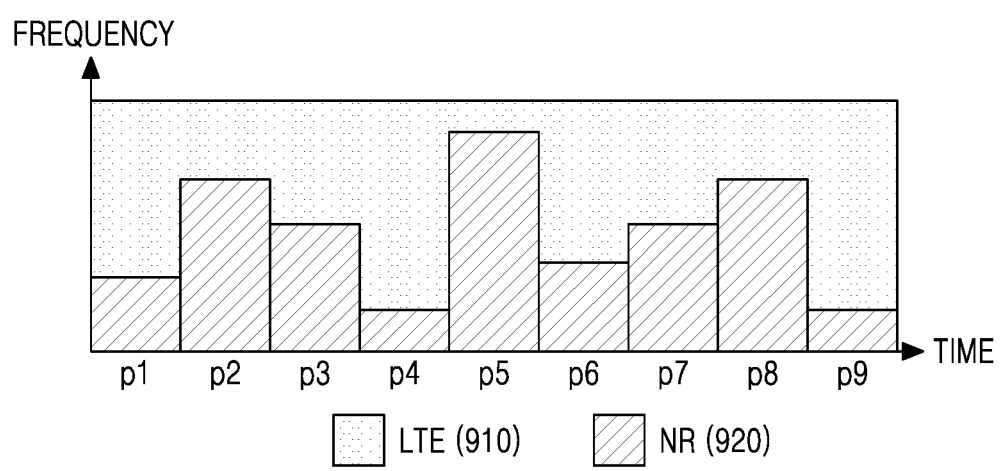
FIG. 9A is a diagram illustrating example spectrum sharing between different wireless communication systems in a time-frequency resource domain according to an embodiment of the disclosure.

FIG. 9A is a diagram for describing spectrum sharing between different wireless communication systems in a time-frequency resource domain.

According to an example embodiment of the disclosure, a plurality of BSs may include BSs that support different wireless communication systems such as a first wireless communication system, a second wireless communication system, or the like. Referring to FIG. 9A, the plurality of BSs may include BSs that support LTE and NR. According to an embodiment of the disclosure, each of the plurality of BSs may determine whether a UE is a UE for LTE or a UE for NR, based on a signal (e.g., a random access channel (RACH) signal) received from the UE. According to another embodiment of the disclosure, when information about a LTE frequency band and information about a NR frequency band are pre-configured, each BS may determine that a UE that transmits a signal in the LTE frequency band is the UE for LTE, and a UE that transmits a signal in the NR frequency band is the UE for NR.

Because a spectrum sharing technology by which NR is also used in an existing LTE frequency band is applied, a frequency band allocated to LTE 910 and a size of a bandwidth allocated to NR 920 may be different according to each time zone. When spectrum sharing is used, a ratio of the LTE frequency band to the NR frequency band may be determined by a core network device. However, this is merely an example, and according to another embodiment of the disclosure, a BS may adjust the ratio of the LTE frequency band to the NR frequency band by not scheduling a UE to particular resource blocks included in the LTE frequency band or the NR frequency band.

When the size of the bandwidth allocated to NR 920 is increased by at least a preset value, in a case of P2, P5, and P8 periods, it is predicted that the number of UEs for NR would increase, and thus it is determined to increase the number of vRAN pre-generated packages. According to another embodiment of the disclosure, when a vRAN package allocated to NR 920 and a vRAN package allocated to LTE 910 co-exist in a server, it may be determined to adjust a resource of a SC configuring each vRAN package, based on a size of a bandwidth allocated to LTE 910 and NR 920. A method by which the server adjusts a resource and the number of SCs based on a change in a size of a bandwidth allocated to LTE 910 and NR 920, according to an example embodiment of the disclosure, will now be described below with reference to FIGS. 9B and 9C.

Figure 9B:
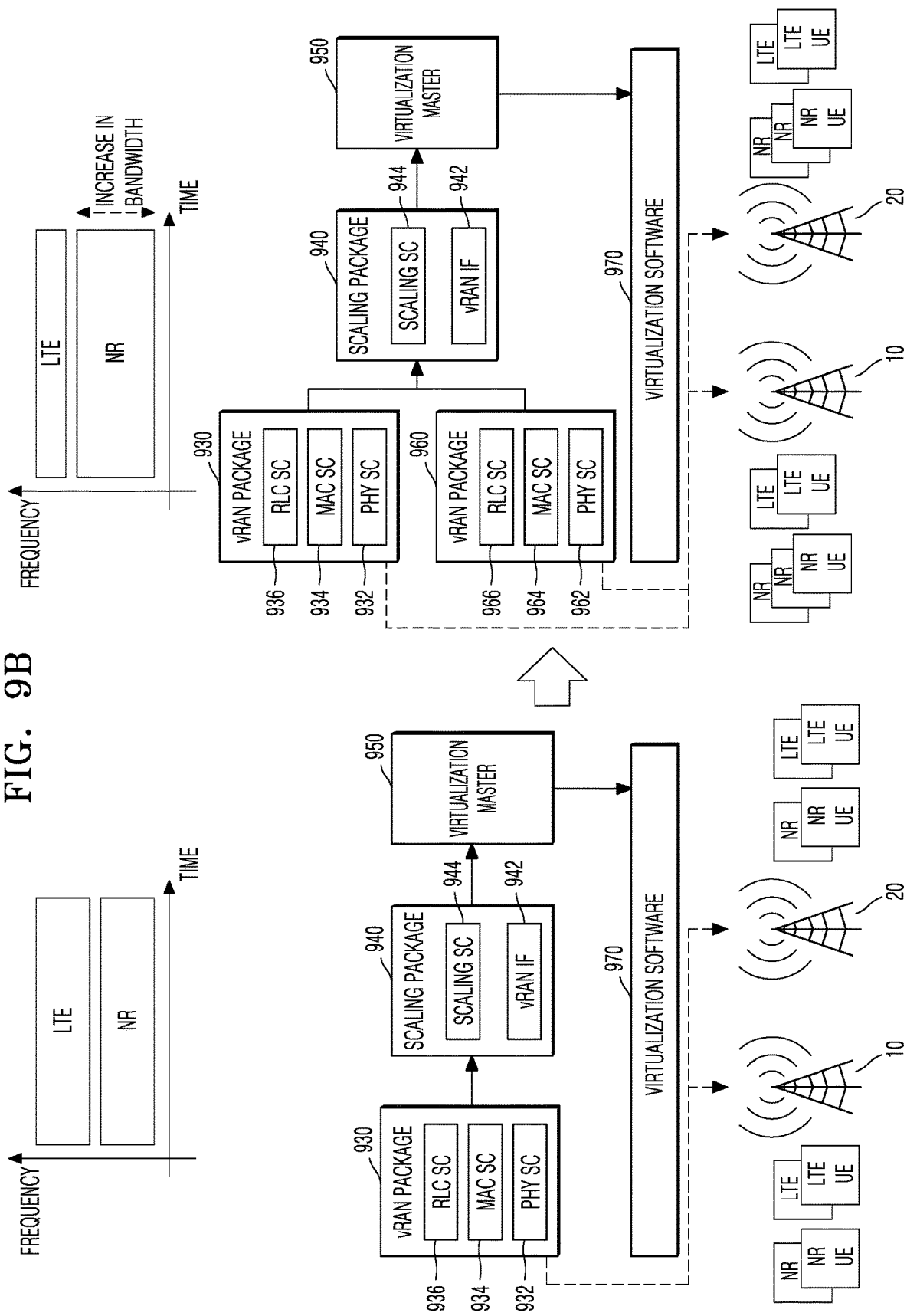
FIG. 9B is a diagram illustrating an example method of adjusting, by a server, the number of vRAN packages based on a change in a bandwidth allocated to new radio (NR), according to an embodiment of the disclosure.

FIG. 9B is a diagram for describing a method of adjusting, by a server, the number of vRAN packages based on a change in a bandwidth allocated to NR, according to an example embodiment of the disclosure.

Referring to FIG. 9B, the server according to an example embodiment of the disclosure may drive software for performing a vRAN function through hardware included in the server. In particular, an OS may be driven in the hardware, and may manage the hardware and virtualization software 970 that is executed in the server.

Because descriptions of the hardware, the OS, and the virtualization software are the same as those provided with reference to FIG. 2, further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

Traffic occurred in the plurality of BSs 10 and 20 may be delivered to a vRAN package 930. A PHY SC 932, a MAC SC 934, and a RLC SC 936 included in the vRAN package 930 may respectively perform a PHY layer function, a MAC layer function, and a RLC layer function on the delivered traffic.

According to an example embodiment of the disclosure, a scaling package 940 may include a vRAN IF 942 and a scaling SC 944. The vRAN IF 942 may receive traffic information about the plurality of BSs 10 and 20 from the vRAN package 930. Also, the vRAN IF 942 may receive, from a core network device (not shown in FIG. 9B), information about NR and LTE frequency-time resources configured in the plurality of BSs 10 and 20. Also, the vRAN IF 942 may receive information about a resource allocated to the vRAN package 930 so as to process the delivered traffic.

The scaling SC 944 may predict NR traffic to occur in the plurality of BSs 10 and 20, based on the traffic information and the information about NR and LTE frequency-time resources configured in the plurality of BSs 10 and 20. For example, the scaling SC 944 may predict that UEs accessing a NR bandwidth increase by at least a threshold value in a t1-t2 time period every Friday, based on the number of UEs accessing the NR bandwidth in each time zone on each day of a week. Also, the scaling SC 944 may identify an amount of a resource used to process traffic occurred in the t1-t2 time period every Friday. Based on a result of the identifying, the scaling SC 944 may predict that 10 CPU cores and 100 GB of a RAM memory would be requested because an amount of traffic increases by at least a first threshold value in the t1-t2 time period every Friday.

In an example embodiment of the disclosure of FIG. 9B, it is assumed that LTE traffic is processed by a separate entity included in the server or is processed by a device separate from the server.

According to an example embodiment of the disclosure, because it is predicted that NR traffic would increase by at least a threshold value in the t1-t2 time period every Friday, the scaling SC 944 may deliver, before a t1 time point, a scale-out command to a virtualization master 950 so as to increase the number of vRAN packages. The virtualization master 950 may deliver the scale-out command to the virtualization software 970, and may update and store vRAN package information that is changed in response to the scale-out command. In response to the scale-out command, the virtualization software 970 may generate a new vRAN package 960 and may allocate a resource to the new vRAN package 960.

The virtualization master 950 may deliver information about the new vRAN package 960 to O&M (not shown in FIG. 9B—see other figures which illustrate O&M). In consideration of the new vRAN package 960, the O&M may determine a vRAN package to process the traffic to occur in the plurality of BSs 10 and 20. For example, traffic of the first BS 10 may be determined to be processed by the existing vRAN package 930, and traffic of the second BS 20 may be determined to be processed by the new vRAN package 960. According to the determination, the O&M may command an EIU (not shown in FIG. 9B—see other figures which illustrate EIU) to allocate the traffic to occur in the plurality of BSs 10 and 20 to each of vRAN packages. Accordingly, the pre-configured vRAN package 930 and the new vRAN package 960 may process traffic occurring in a bandwidth allocated to NR.

Figure 9C:
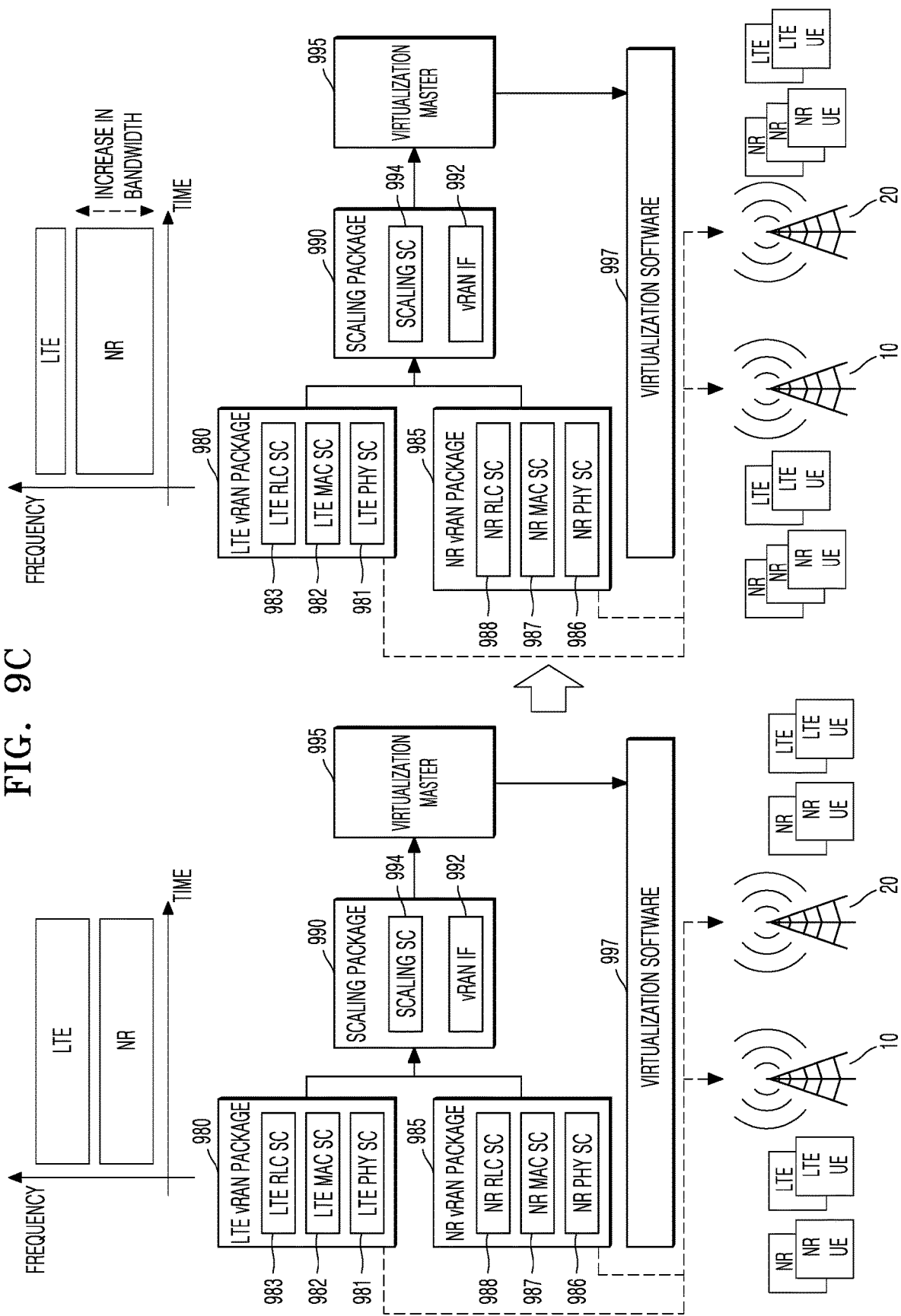
FIG. 9C is a diagram illustrating an example method of adjusting, by a server, a resource of a SC included in a vRAN package based on a change in a bandwidth allocated to NR, according to an embodiment of the disclosure.

FIG. 9C is a diagram for describing a method of adjusting, by a server, a resource of a SC included in a vRAN package based on a change in a bandwidth allocated to NR, according to an example embodiment of the disclosure.

Referring to FIG. 9C, the server according to an embodiment of the disclosure may drive software for performing a vRAN function through hardware included in the server. In particular, an OS may be driven in the hardware, and may manage the hardware and virtualization software 997 that is executed in the server. Because descriptions of the hardware, the OS, and the virtualization software are the same as those provided with reference to FIGS. 2-4, further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

A LTE vRAN package 980 executed in the server may include a LTE RLC SC 983, a LTE MAC SC 982, and a LTE PHY SC 981 for performing functions of a RLC layer, a MAC layer, and a PHY layer that are for LTE. Also, a NR vRAN package 985 may include a NR RLC SC 988, a NR MAC SC 987, and a NR PHY SC 986 for performing functions of a RLC layer, a MAC layer, and a PHY layer that are for NR. Traffic occurred in the plurality of BSs 10 and 20 may be delivered to each of the LTE vRAN package 980 and the NR vRAN package 985.

According to an embodiment of the disclosure, a scaling package 990 may include a vRAN IF 992 and a scaling SC 994. The vRAN IF 992 may receive information about the traffic of the plurality of BSs 10 and 20, the traffic being delivered to the LTE vRAN package 980 and the NR vRAN package 985. Also, the vRAN IF 992 may receive, from a core network device, information about NR and LTE frequency-time resources configured in the plurality of BSs 10 and 20. Also, the vRAN IF 992 may receive information about a resource allocated to the LTE vRAN package 980 and the NR vRAN package 985 so as to process the delivered traffic.

The scaling SC 944 may predict LTE traffic and NR traffic to occur in the plurality of BSs 10 and 20, based on the traffic information and the information about NR and LTE frequency-time resources configured in the plurality of BSs 10 and 20. For example, the scaling SC 994 may predict that UEs accessing a NR bandwidth increase by at least a first threshold value in a t3-t4 time period every Saturday, based on the number of UEs accessing the NR bandwidth in each time zone on each day of a week. Also, the scaling SC 994 may identify an amount of a resource that is additionally requested to process the predicted traffic. Based on a result of the identifying, the scaling SC 994 may predict that 2 CPU cores and 50 GB of a RAM memory would be requested by the NR vRAN package 985 in the t3-t4 time period every Saturday.

According to an example embodiment of the disclosure, the scaling SC 994 may deliver, before a t3 time point, a scale-up command to a virtualization master 995 so as to increase a resource of SCs 986, 987, and 988 that perform functions of NR network layers in the NR vRAN package 985. The virtualization master 995 may deliver the scale-up command to the virtualization software 997, and may update and store vRAN package information that is changed in response to the scale-up command. In response to the scale-up command, the virtualization software 997 may increase an amount of a resource to be allocated to the NR vRAN package 985.

Because it is predicted that the number of UEs accessing a LTE bandwidth in the t3-t4 time period would decrease by at least a second threshold value, the scaling SC 994 may deliver a scale-down command to the virtualization master 995 so as to decrease a resource of SCs 981, 982, and 983 that perform functions of LTE network layers in the LTE vRAN package 980. The virtualization master 995 may deliver the scale-down command to the virtualization software 997, and may update and store LTE vRAN package information that is changed in response to the scale-down command. In response to the scale-down command, the virtualization software 997 may decrease an amount of a resource to be allocated to the LTE vRAN package 980.

Figure 10A:
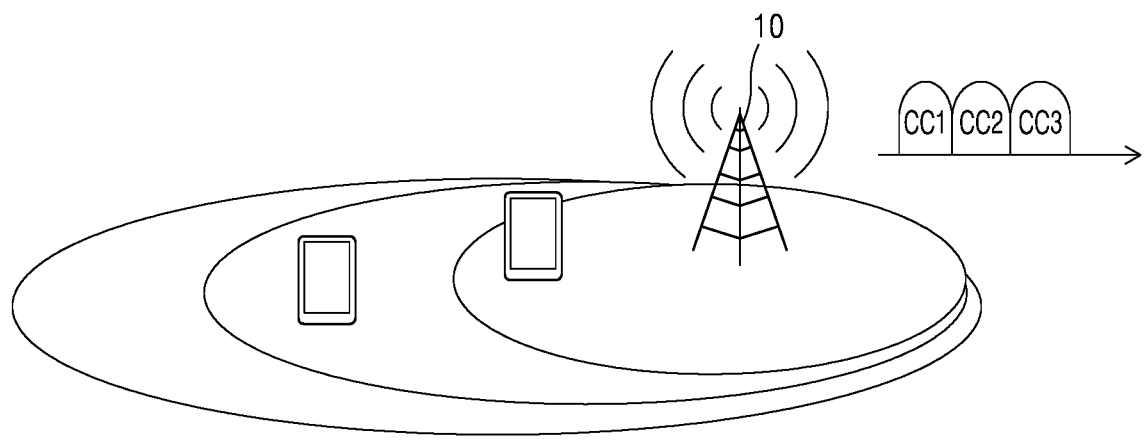
FIG. 10A is a diagram illustrating example carrier aggregation according to an embodiment of the disclosure.

FIG. 10A is a diagram for describing carrier aggregation.

Referring to FIG. 10A, the BS 10 may support a wider UL or DL bandwidth by aggregating a plurality of component carriers (CCs) with respect to each of UL and DL. For example, the BS 10 may support a wider UL bandwidth by aggregating CC1, CC2, and CC3 that are component carriers. Through carrier aggregation, a UE may transmit data on a UL to a BS through a plurality of CCs or may receive data on a DL from the BS through the plurality of CCs, such that a data transmission/reception speed may be improved.

Each of the plurality of CCs may be or may not be adjacent to each other in a frequency domain. Bandwidths with respect to a CC may be independently determined. The number of CCs with respect to a UL and the number of CCs with respect to a DL may be determined to be same or different from each other.

In an example embodiment of the disclosure, a server may perform scaling according to carrier aggregation. For example, when the number of NR CCs that are a target of carrier aggregation is increased, the server may increase the number of vRAN packages, each consisting of SCs capable of performing network functions of the NR. The example will now be further described with reference to FIG. 10B.

Figure 10B:
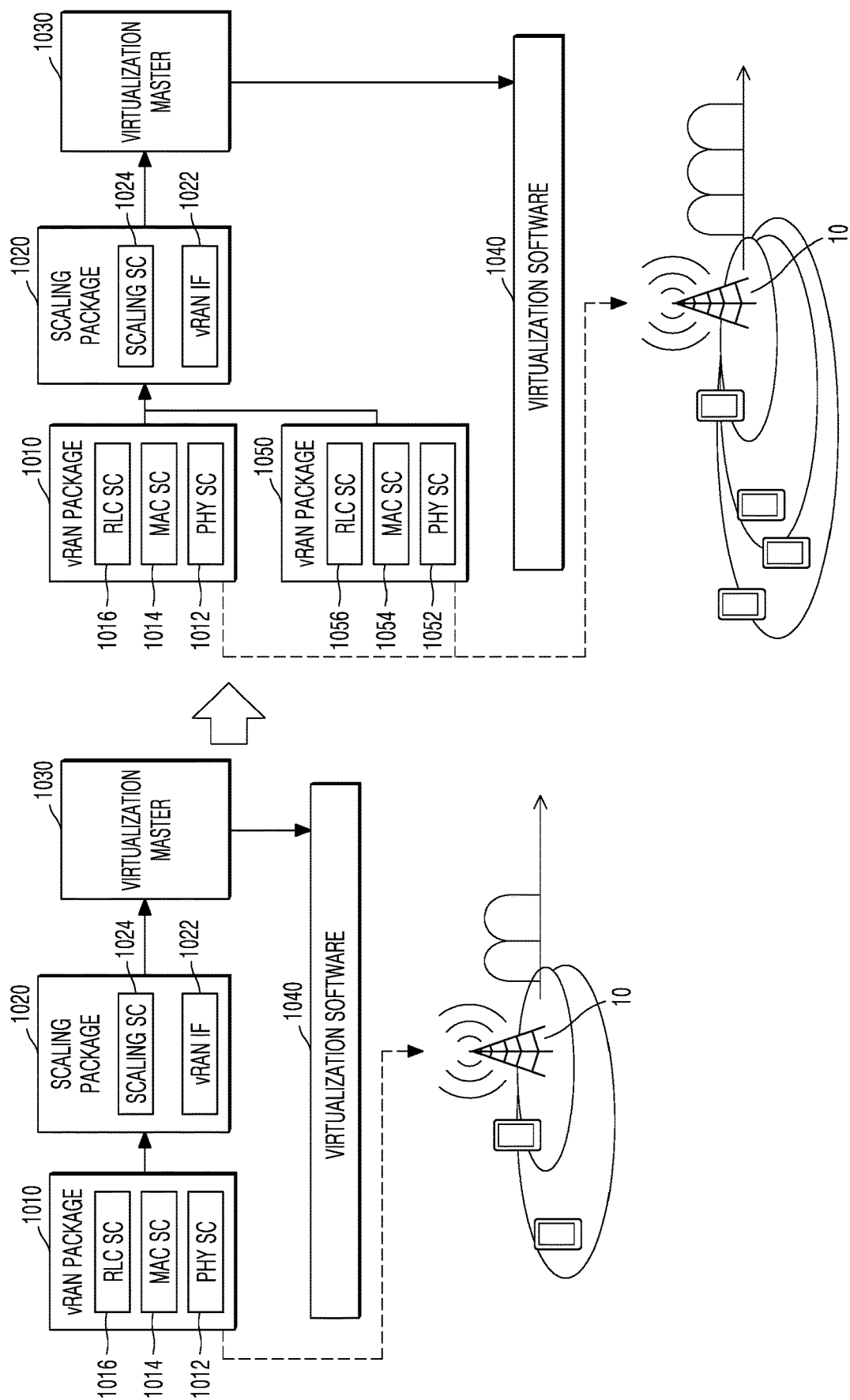
FIG. 10B is a diagram illustrating an example method of performing, by a server, scaling upon application of carrier aggregation, according to an embodiment of the disclosure.

FIG. 10B is a diagram for describing a method of performing, by a server, scaling upon application of carrier aggregation, according to an embodiment of the disclosure.

Referring to FIG. 10B, the server according to an embodiment of the disclosure may drive software for performing a vRAN function through hardware included in the server. In particular, an OS may be driven in the hardware, and may manage the hardware and virtualization software 1040 that is executed in the server. Because descriptions of the hardware, the OS, and the virtualization software are the same as those provided with reference to FIGS. 2-4, further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like Traffic occurred in the BS 10 may be delivered to a vRAN package 1010. A PHY SC 1012, a MAC SC 1014, and a RLC SC 1016 included in the vRAN package 1010 may respectively perform a PHY layer function, a MAC layer function, and a RLC layer function on the delivered traffic. For convenience of description, FIG. 10B illustrates only one BS 10, but a plurality of BSs may be connected to the server.

According to an example embodiment of the disclosure, a scaling package 1020 may include a vRAN IF 1022 and a scaling SC 1024. The vRAN IF 1022 may receive traffic information about the traffic of the BS 10, the traffic being delivered to the vRAN package 1010 (or vRAN package 1050, including SCs 1052, 1054, and 1056). Also, the vRAN IF 1022 may receive information about a frequency resource in which the traffic delivered to the vRAN package 1010 occurred. Also, the vRAN IF 1022 may receive information about a resource allocated to the vRAN package 1010 so as to process the delivered traffic.

The scaling SC 1024 may identify a pattern of the traffic occurred in the BS 10, based on the traffic information and the information about the frequency resource in which the traffic occurred, the traffic information and the information being received by the vRAN IF 1022. For example, based on the traffic information and the information about the frequency resource in which the traffic occurred, the server may identify a change in the number of NR CCs that are a target of carrier aggregation.

Based on the change in the number of NR CCs that are a target of carrier aggregation, the scaling SC 1024 may identify a time period in which the number of NR CCs that are a target of carrier aggregation is equal to or greater than a threshold value. In this regard, when the number of NR CCs that are a target of carrier aggregation is increased, the scaling SC 1024 may predict that NR traffic would increase due to an increase in the number of NR UEs accessing the BS 10.

In the example embodiment of the disclosure of the FIG. 10B, LTE traffic may be processed by a separate entity included in the server. According to another embodiment of the disclosure, LTE traffic may be processed by a device separate from the server.

According to an example embodiment of the disclosure, when it is predicted that the number of NR CCs that are a target of carrier aggregation would increase by at least a threshold value in a t1-t2 period, the scaling SC 1024 may deliver a scale-out command to a virtualization master 1030 so as to increase the number of vRAN packages before a t1 time.

The virtualization master 1030 may deliver the scale-out command to the virtualization software 1040, and may update and store vRAN package information that is changed in response to the scale-out command. In response to the scale-out command, the virtualization software 1040 may generate a new vRAN package and may allocate a resource to the new vRAN package.

The virtualization master 1030 may deliver information about the new vRAN package to O&M (not shown). In consideration of the new vRAN package, the O&M may determine a vRAN package to process the traffic to occur in the BS 10. Accordingly, the existing vRAN package 1010 and the new vRAN package may process traffic occurring in a bandwidth of NR CC.

Figure 11:
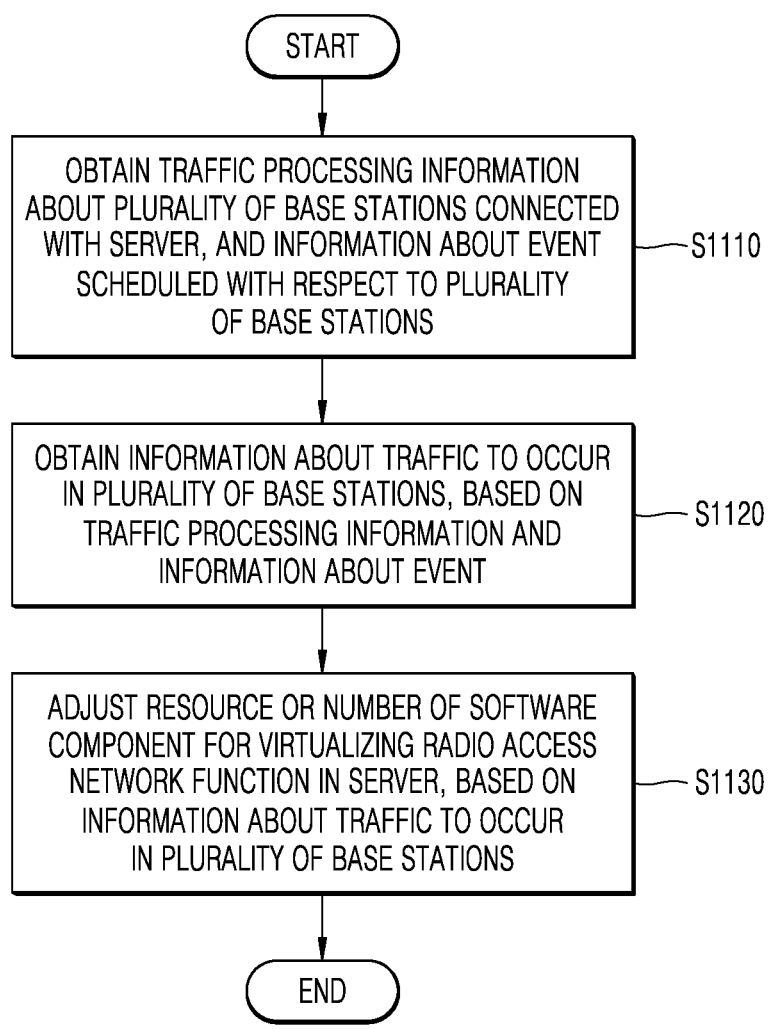
FIG. 11 is a flowchart illustrating an example method, performed by a server, of adjusting a SC based on an event scheduled with respect to a plurality of BSs, according to an embodiment of the disclosure.

FIG. 11 is a flowchart for describing a method, performed by a server, of adjusting a SC based on an event scheduled with respect to a plurality of BSs, according to an example embodiment of the disclosure.

In operation S1110, the server may obtain traffic processing information about the plurality of BSs connected with the server, and information about the event scheduled with respect to the plurality of BSs. The event refers to a factor that may affect traffic to occur in a BS, the number of UEs accessing the BS, a frequency band used by a UE, a wireless communication system, a type of a service, or the like, and may include, but is not limited to, a sports event, assembly, a concert, a holiday, a public holiday, or the like. According to another embodiment of the disclosure, the event may include an incident such as an unexpected accident occurring in a network.

The server according to an example embodiment of the disclosure may obtain, from the traffic processing information, information about traffic occurred when the event was previously carried out. The server may identify a traffic pattern according to the event, based on the information about the traffic occurred when the event was carried out. For example, the server may identify an amount of traffic and a time when the amount of traffic reaches its peak in the case of a previous football match. The server may predict an amount of traffic to occur in a football match scheduled in a particular time, based on the identified amount of traffic.

According to an example embodiment of the disclosure, the server may pre-store information about traffic occurred in the plurality of BSs, according to each type of events.

The server according to an example embodiment of the disclosure may receive information about an event in which a change in traffic is predicted with respect to the plurality of BSs, from an external device (e.g., a core network device). However, this is merely an example, and thus, the server may receive, from the plurality of BSs, the information about the event in which the change in traffic is predicted.

In operation S1120, the server may obtain information about traffic to occur in the plurality of BSs, based on the traffic processing information and the information about the event. The server according to an embodiment of the disclosure may compare an amount of traffic which is identified from the traffic processing information and is pre-occurred according to each event with the event by which traffic is predicted to occur in the plurality of BSs, and thus may obtain the information about the traffic to occur in the plurality of BSs.

For example, when the scheduled event is a concert, the server may obtain the information about the traffic to occur in the plurality of BSs, based on a traffic pattern generated during a previous concert. Also, the server may obtain the information about the traffic to occur in the plurality of BSs by combining the traffic pattern generated during the previous concert with a traffic pattern that is recently generated. For example, based on traffic processing information indicating that an amount of traffic occurred 10 minutes before the concert starts is 500 Mbps, and the traffic increases by three times when the concert starts, the server may obtain traffic information indicating that, when the concert starts, an amount of traffic to occur in the plurality of BSs is 1500 Mbps.

In operation S1130, the server may adjust a resource or the number of SCs for virtualizing a RAN function in the server, based on the information about the traffic to occur in the plurality of BSs.

According to an example embodiment of the disclosure, because the server determines that the amount of the traffic to occur in a time in which the football match is scheduled increases by at least a threshold value, the server may increase the number of the SCs before a time point when the football match begins. However, this is merely an example, and thus, when the server determines that an amount of traffic would decrease when a particular event occurs, the server may decrease the number of the SCs.

Meanwhile, because service types or frequency domains where traffic occurs vary according to each event, a layer function to which a load is added for processing the traffic may vary. In this case, the server may adjust a resource of a SC that performs a particular layer function. For example, the server may increase a portion of a CPU, a portion of a memory, a portion of a GPU, or the like, each portion being allocated to the SC that performs the particular layer function. As another example, the server may decrease the resource of the SC that performs the particular layer function. For example, the server may decrease the portion of the CPU, the portion of the memory, the portion of a GPU, or the like, each portion being allocated to the SC that performs the particular layer function.

Figure 12:
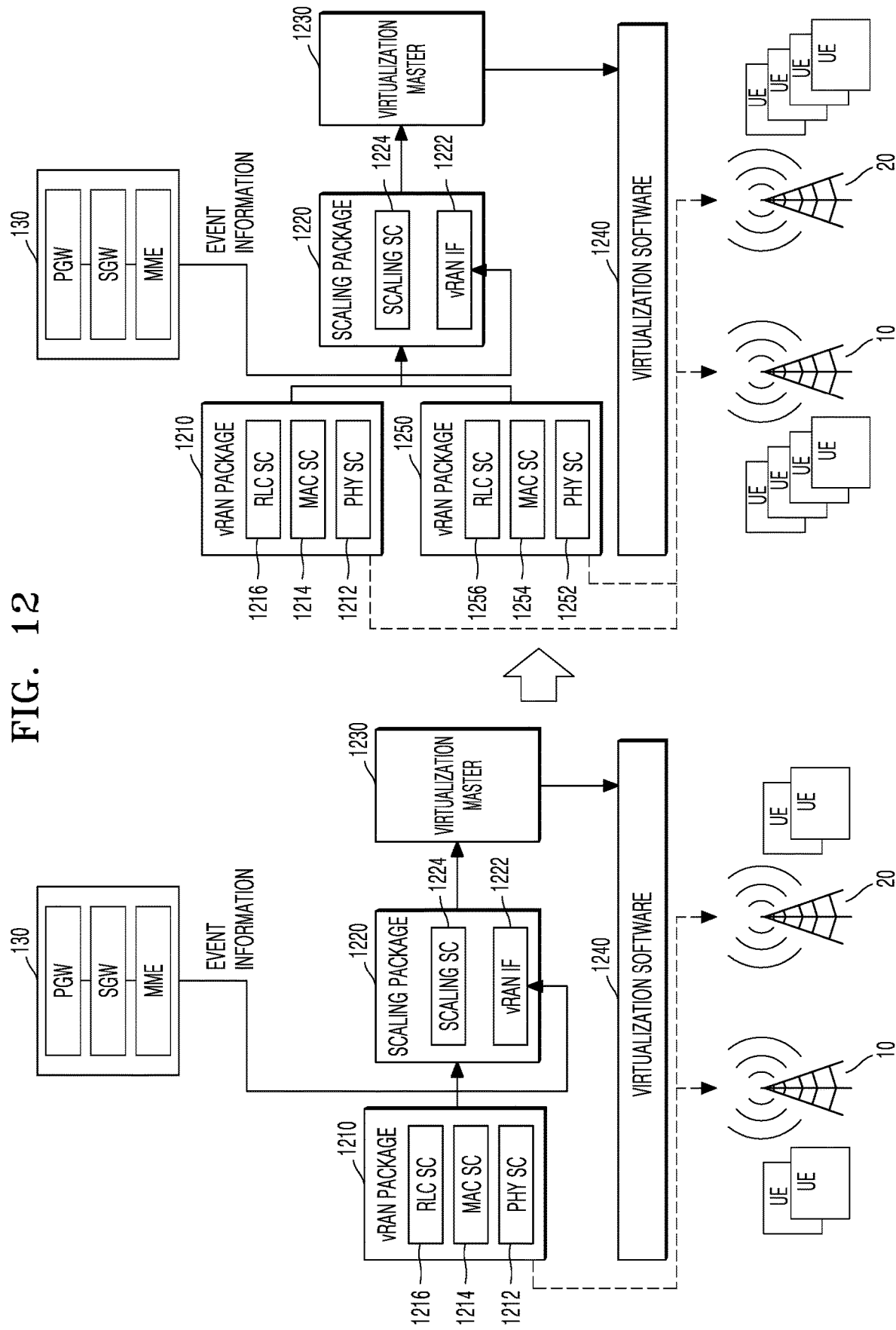
FIG. 12 is a diagram illustrating an example server for adjusting a resource or the number of SCs based on information about an event, according to an embodiment of the disclosure.

FIG. 12 is a diagram for describing a server for adjusting a resource or the number of SCs based on information about an event, according to an example embodiment of the disclosure.

Referring to FIG. 12, the server may drive software for performing a vRAN function through hardware included in the server. In particular, an OS may be driven in the hardware, and may manage the hardware and virtualization software 1240 that is executed in the server. Because descriptions of the hardware, the OS, and the virtualization software are the same as those provided with reference to FIGS. 2-4, further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

Traffic occurred in the plurality of BSs 10 and 20 may be delivered to a vRAN package 1210 (and/or 1250). A PHY SC 1212, a MAC SC 1214, and a RLC SC 1216 included in the vRAN package 1210 may respectively perform a PHY layer function, a MAC layer function, and a RLC layer function on the delivered traffic.

According to an embodiment of the disclosure, a scaling package 1220 may include a vRAN IF 1222 and a scaling SC 1224. The vRAN IF 1222 may receive traffic information about the traffic of the plurality of BSs 10 and 20, the traffic being delivered to the vRAN package 1210. Also, the vRAN IF 1222 may receive information about a resource allocated to the vRAN package 1210 so as to process the delivered traffic. The vRAN IF 1222 may also obtain information about an event scheduled with respect to the plurality of BSs 10 and 20 from a core network device 130.

The scaling SC 1224 may obtain information about traffic to occur in the plurality of BSs 10 and 20, based on traffic processing information and the information about the event, and may determine at least one of the number of SCs or a resource of the SC, based on the obtained information about the traffic. The scaling SC 1224 may identify, based on the obtained information about the traffic, an amount of traffic in a previous football match, and a time point when the amount of traffic reaches its peak. The scaling SC 1224 may predict, based on the identified amount of traffic, an amount of traffic to occur in a football match scheduled at a particular time.

As a result of the prediction, when the scaling SC 1224 determines that the amount of the traffic to occur in the time in which the football match is scheduled is to be equal to or greater than a threshold value, the scaling SC 1224 may deliver a scale-out command to a virtualization master 1230 so as to increase the number of vRAN packages before a time point when the football match begins.

The virtualization master 1230 may deliver the scale-out command to the virtualization software 1240, and may update and store vRAN package information that is changed in response to the scale-out command. In response to the scale-out command, the virtualization software 1240 may generate a new vRAN package 1250 and may allocate a resource to the new vRAN package 1250.

The virtualization master 1230 may deliver information about the new vRAN package 1250 to O&M. In consideration of the new vRAN package 1250, the O&M may determine a vRAN package to process the traffic to occur in the plurality of BSs 10 and 20. For example, traffic of the first BS 10 may be determined to be processed by the existing vRAN package 1210, and traffic of the second BS 20 may be determined to be processed by the new vRAN package 1250. According to the determination, the O&M may command an EIU to allocate the traffic to occur in the plurality of BSs 10 and 20 to each of vRAN packages.

Figure 13:
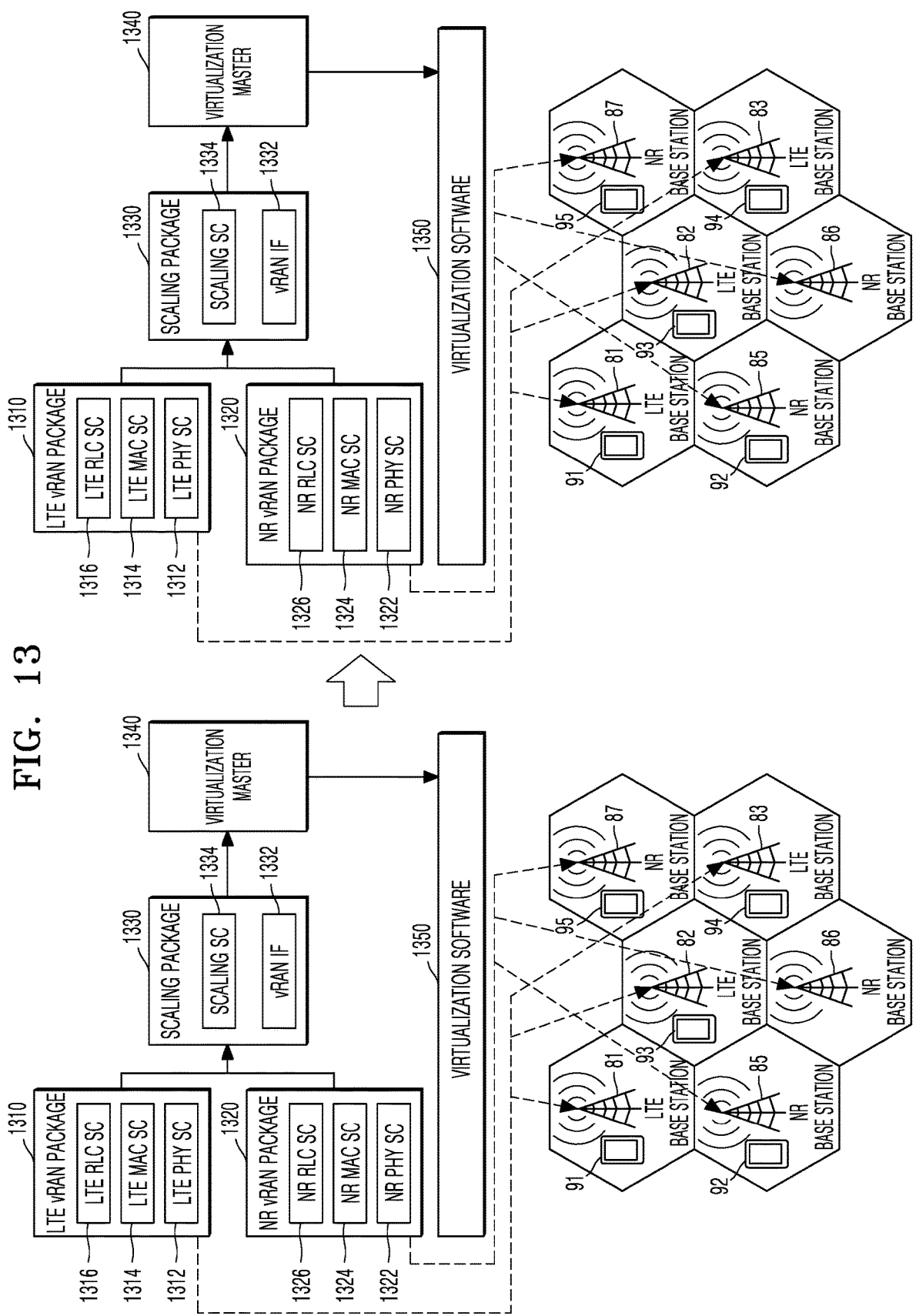
FIG. 13 is a diagram illustrating an example server for adjusting a resource or the number of SCs based on information about an event, according to another embodiment of the disclosure.

FIG. 13 is a diagram for describing a server for adjusting a resource or the number of SCs based on information about an event, according to another example embodiment of the disclosure.

Referring to FIG. 13, the server according to an example embodiment of the disclosure may drive software for performing a vRAN function through hardware included in the server. In particular, an OS may be driven in the hardware, and may manage the hardware and virtualization software 1350 that is executed in the server. Because descriptions of the hardware, the OS, and the virtualization software are the same as those provided with reference to FIGS. 2-4, further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

A LTE vRAN package 1310 executed in the server may include a LTE RLC SC 1316, a LTE MAC SC 1314, and a LTE PHY SC 1312 for performing functions of a RLC layer, a MAC layer, and a PHY layer that are for LTE. Also, a NR vRAN package 1320 may include a NR RLC SC 1326, a NR MAC SC 1324, and a NR PHY SC 1322 for performing functions of a RLC layer, a MAC layer, and a PHY layer that are for NR. LTE traffic and NR traffic occurred in a plurality of BSs 81, 82, 83, 85, 86, and 87 (also referred to as the LTE BSs 81, 82, and 83 and the NR BSs 85, 86, and 87) may be delivered to the LTE vRAN package 1310 and the NR vRAN package 1320, respectively.

According to an embodiment of the disclosure, a scaling package 1330 may include a vRAN IF 1332 and a scaling SC 1334. The vRAN IF 1332 may receive information about the traffic of the plurality of BSs 81, 82, 83, 85, 86, and 87, the traffic being delivered to the plurality of vRAN packages 1310 and 1320. Also, the vRAN IF 1332 may receive information about a resource allocated to the plurality of vRAN packages 1310 and 1320 so as to process the delivered traffic. The vRAN IF 1332 may also obtain information about an event.

In this regard, the event may include not only a scheduled occasion but may also include an accident, a disaster, or the like that suddenly occurs. For example, the scaling SC 1334 may obtain, from a core network device or another external device, event information indicating that an operation of some LTE BSs 81 and 82 will stop after a preset time due to fire in the LTE BSs 81 and 82 from among the LTE BSs 81, 82, and 83. As another example, the scaling SC 1334 may receive, from the vRAN IF 1332, information indicating that connection to some LTE BSs 81 and 82 is disconnected.

According to an example embodiment of the disclosure, when UEs 91 and 93 that are connected to the LTE BSs 81, 82, and 83 are UEs capable of selectively using LTE or NR, the UEs 91 and 93 may access a near NR BS 85. In this case, traffic to be processed by the NR vRAN package 1320 may be increased.

When the scaling SC 1334 according to an example embodiment of the disclosure predicts that the number of UEs accessing the NR BSs 85, 86, and 87 would increase, the NR vRAN package 1320 may deliver a scale-up command to a virtualization master 1340 so as to increase a resource of SCs to perform NR network layer functions. The virtualization master 1340 may deliver the scale-up command to the virtualization software 1350, and may update and store resource information of the NR vRAN package 1320, the resource information being changed in response to the scale-up command. The virtualization software 1350 may increase a resource to be allocated to the NR vRAN package 1320, in response to the scale-up command. For example, referring to FIG. 13, the virtualization software 1350 may increase a CPU, a memory, and a GPU that are allocated to each of the NR RLC SC 1326, the NR MAC SC 1324, and the NR PHY SC 1322.

When the scaling SC 1334 predicts that the number of UEs accessing the LTE BSs 81, 82, and 83 would decrease, the LTE vRAN package 1310 may deliver a scale-down command to the virtualization master 1340 so as to decrease a resource of SCs to perform LTE network layer functions. The virtualization master 1340 may deliver the scale-down command to the virtualization software 1350, and may update and store resource information of the LTE vRAN package 1310, the resource information being changed in response to the scale-down command. The virtualization software 1350 may decrease a resource to be allocated to the LTE vRAN package 1310, in response to the scale-down command. For example, referring to FIG. 13, the virtualization software 1350 may decrease a CPU, a memory, and a GPU that are allocated to each of the LTE RLC SC 1316, the LTE MAC SC 1314, and the LTE PHY SC 1312.

Figure 14:
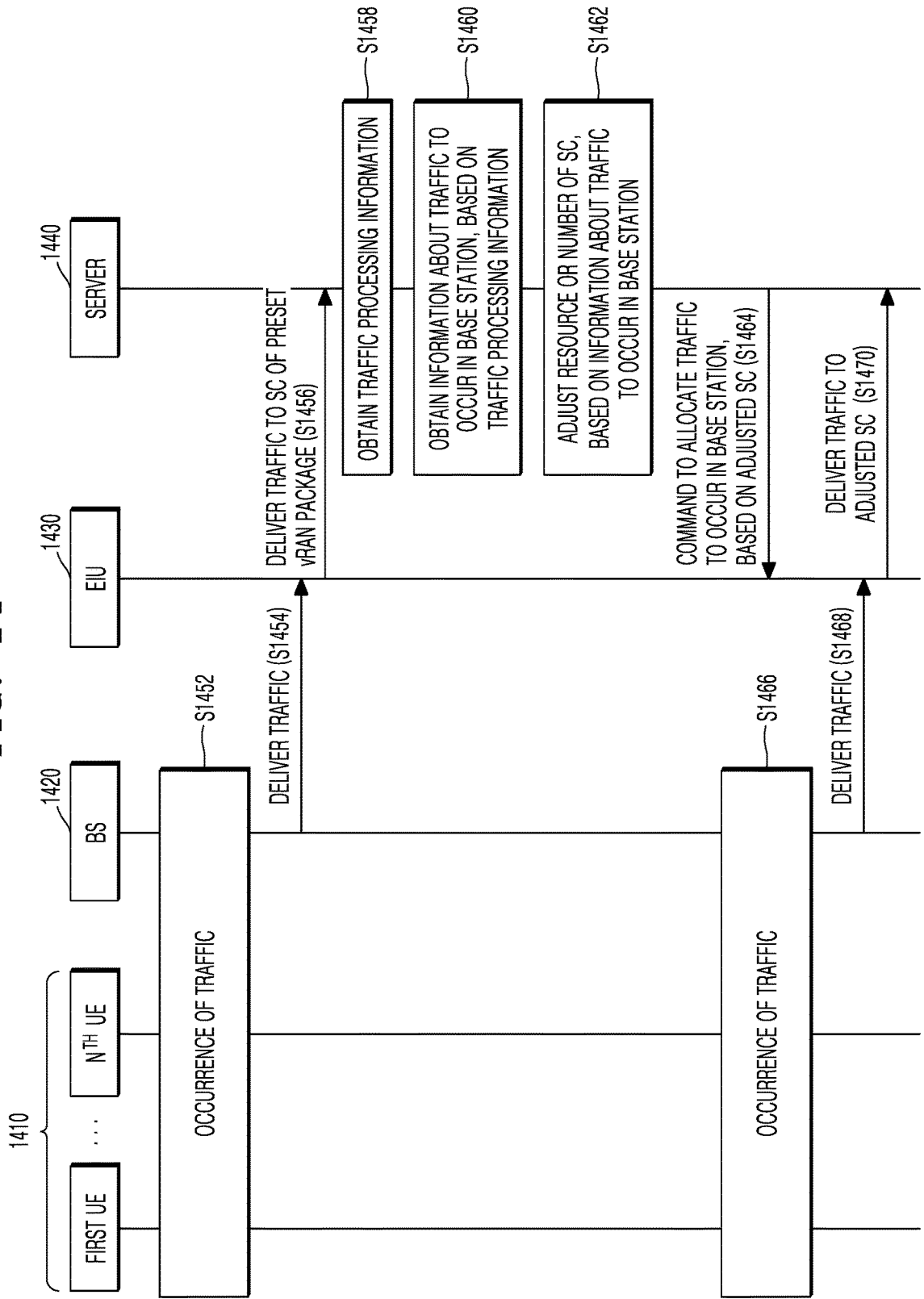
FIG. 14 is a signal flow diagram illustrating example operations of a server for processing traffic between a plurality of UEs and a BS by adjusting a SC, according to an embodiment of the disclosure.

FIG. 14 is a flowchart for describing operations of a server for processing traffic between a plurality of UEs 1410 and a BS 1420 by adjusting a SC, according to an example embodiment of the disclosure.

In operation S1452, traffic may occur between the plurality of UEs 1410 and the BS 1420. As described above with reference to FIG. 2, the traffic refers to a data flow passing through a communication network in a predefined time, and a present example embodiment of the disclosure, the traffic may occur between the plurality of UEs 1410 and the BS 1420 so as to exchange information for achieving a particular purpose (e.g., usage of a particular service).

In operation S1454, the BS 1420 may deliver the traffic to an EIU 1430. The EIU 1430 is a portion of a path connecting a server 1440 to a plurality of BSs (including the BS 1420) of a cell site.

In operation S1456, the EIU 1430 may deliver the traffic to a SC of a preset vRAN package of the server 1440. Information about BSs respectively allocated to at least one vRAN package generated in the server 1440 may be pre-configured in the EIU 1430.

In operation S1458, the server 1440 may obtain traffic processing information. The traffic processing information may include information about traffic occurred in the plurality of BSs, and information about a resource used in processing the traffic. The server 1440 may obtain the information about the traffic by monitoring the traffic delivered from each of the plurality of BSs (including the BS 1420) to the vRAN package via the EIU 1430. Also, the server 1440 may obtain information about a resource allocated to each vRAN package so as to process the delivered traffic.

Operation S1458 corresponds to operation S610 described above with reference to FIG. 6, and thus descriptions overlapping with those of operation S610 are not provided here.

In operation S1460, the server 1440 may obtain information about traffic to occur in the plurality of BSs, based on the traffic processing information.

Operation S1460 corresponds to operation S620 described above with reference to FIG. 6, and thus descriptions overlapping with those of operation S620 are not provided here.

In operation S1462, the server 1440 may adjust a resource or the number of the SCs, based on the information about the traffic to occur in the plurality of BSs.

Operation S1462 corresponds to operation S630 described above with reference to FIG. 6, and thus descriptions overlapping with those of operation S630 are not provided here.

In operation S1464, the server 1440 may command the EIU 1430 to allocate the traffic to occur in the BS 1420, based on the adjusted SC. For example, when a BS to be allocated to each vRAN package is changed because a vRAN package is newly generated or a vRAN package is removed in operation S1462, the server 1440 may deliver BS allocation information according to each of changed vRAN packages to the EIU 1430. Also, when a resource to be allocated to the SC is changed in operation S1462, the server 1440 may deliver information about the changed SC to the EIU 1430. However, this is merely an example, and thus, when the resource to be allocated to the SC is changed, the server 1440 may not deliver the information thereof to the EIU 1430.

In operation S1466, traffic may occur between the plurality of UEs 1410 and the BS 1420. In a present embodiment of the disclosure, for convenience of description, occurrence of the traffic is illustrated to indicate the traffic occurred after the SC of the server 1440 is adjusted, but this is merely an example, and the present embodiment of the disclosure is not limited to a case in which the occurrence of the traffic is performed after the SC is adjusted.

In operation S1468, the BS 1420 may deliver the traffic to the EIU 1430.

In operation S1470, the EIU 1430 may deliver the traffic to the adjusted SC, in response to a command received in operation S1464. For example, when a vRAN package is newly generated in the server 1440, and a command for allocating the BS 1420 to the newly-generated vRAN package is received, the EIU 1430 may deliver the traffic to a SC of the newly-generated vRAN package.

Figure 15:
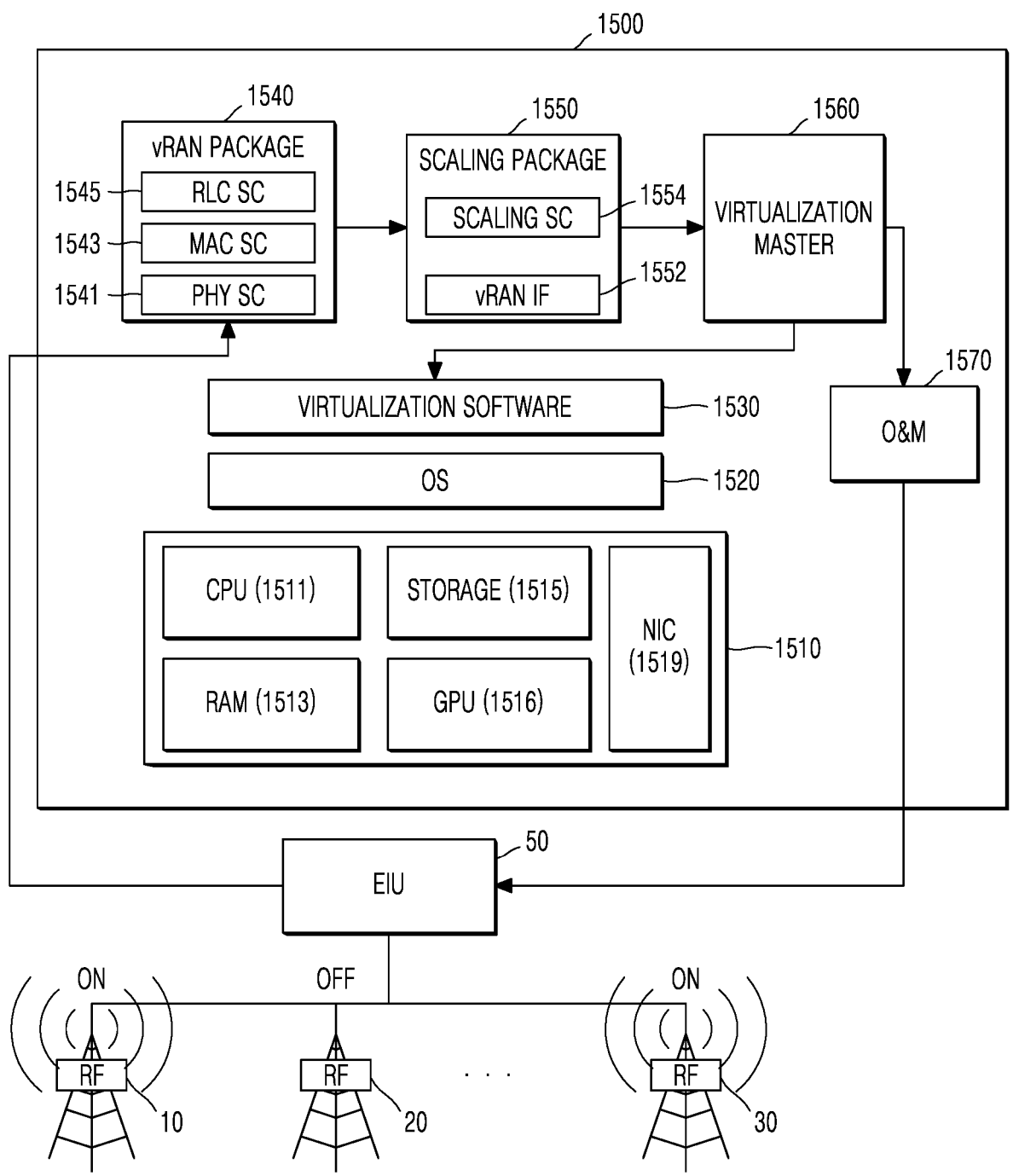
FIG. 15 is a diagram illustrating an example method, performed by a vRAN, of adjusting the number of vRAN packages and a resource of a SC, in consideration of on/off of a BS, using a pre-generated AI model, according to an embodiment of the disclosure.

FIG. 15 is a diagram for describing a method, performed by a vRAN, of adjusting the number of vRAN packages and a resource of a SC, in consideration of on/off of a BS, by using a pre-generated AI model, according to an example embodiment of the disclosure.

Referring to FIG. 15, a server 1500 may include hardware 1510 capable of driving software for performing a vRAN function. The hardware 1510 may include a CPU, a RAM, a storage, a GPU, and a NIC but this is merely an example, and elements of the hardware 1510 are not limited thereto.

An OS 1520 may manage software (e.g., virtualization software 1530) that is executed in/by the hardware 1510 and the server 1500.

The virtualization software 1530 may manage the hardware 1510 to process traffic.

Hereinafter, a method of determining the number of vRAN packages 1540, a resource to be allocated to a SC, and whether to activate a plurality of BSs 10, 20, and 30, the method being performed to process traffic of the plurality of BSs 10, 20, and 30, will now be described in detail. Hereinafter, the plurality of BSs 10, 20, and 30 may also be referred to as the first, second, and third BSs 10, 20, and 30.

The vRAN package 1540 (including SCs 1541, 1543, 1545) may process traffic occurred in the plurality of BSs 10, 20, and 30, based on an allocated resource. The vRAN package 1540 may transmit traffic processing information to a vRAN IF 1552 of scaling package 1550. Also, the vRAN package 1540 may receive, from the plurality of BSs 10, 20, and 30, signal measurement information obtained from each of a plurality of UEs respectively connected to the plurality of BSs 10, 20, and 30. The signal measurement information is information indicating a reception power of a reference signal transmitted from each of the plurality of BSs 10, 20, and 30. The signal measurement information may include information indicating a power of a reference signal received from a BS (e.g., the BS 10) that a UE camps on, and information indicating a power of a reference signal received from a neighboring BS (e.g., the BS 20) adjacent to the BS that the UE camps on.

According to another embodiment of the disclosure, the vRAN IF 1552 may obtain event information from an external server or via a user input.

The vRAN IF 1552 may transmit the traffic processing information, the signal measurement information, and the event information to a scaling SC 1554. According to an embodiment of the disclosure, the scaling SC 1554 may determine the number of vRAN packages, a resource of a SC, and a mode of a BS for processing traffic to occur at a later time, based on the current number of vRAN packages 1540 and a resource allocated to each SC of the vRAN package 1540, and the traffic processing information, the signal measurement information, and the event information that are obtained from the vRAN IF 1552. In the present example embodiment of the disclosure, for convenience of description, the current number of the vRAN packages 1540 and the resource allocated to each SC of the vRAN package 1540 are referred to as vRAN package information. Also, the mode of the BS is information indicating an active state of a BS and may include an "on mode" where the BS is in an active state and an "off mode" where the BS is in an inactive state.

To determine the number of vRAN packages, the resource of the SC, and the mode of the BS for processing traffic to occur at a later time, the scaling SC 1554 may use a pre-generated AI model. The AI model denotes an artificial neural network model simulating a neural network of a human brain, and is not limited to an artificial neural network model using a particular algorithm. The AI model may be stored in a CPU of the hardware 1510 but this is merely an example and thus the AI model may be stored in an external server.

For training of the AI model used in the example embodiment of FIG. 15, input data and evaluation data as below may be used.

| Input data | Evaluation data |
| --- | --- |
| (1) traffic processing information | (1) the number of vRAN packages |
| (2) event information | (2) resource of SC |
| (3) vRAN package information | (3) mode of BS |
| (4) signal measurement information | |

The input data denotes data applied to input nodes of layers constituting a neural network of an AI model. The input data according to an embodiment of the disclosure may include the traffic processing information, the event information, the vRAN package information, and the signal measurement information. The evaluation data denotes data used in determining a parameter of each of the layers constituting the neural network of the AI model. The evaluation data may include the number of vRAN packages, a resource of a SC, and a mode of a BS. The parameter denotes a value used in a calculation process of each of the layers constituting the neural network of the AI model, and may include a weight to be used in applying an input value to a preset calculation formula. Also, the parameter may be a value set as a result of training, and the value of the parameter may be modified and refined based on the input data of the AI model. For example, the parameter of the AI model may be trained by comparing output data with the evaluation data, the output data being obtained as a result of applying the input data to the AI model.

The scaling SC 1554 may determine, by using the AI model, the number of vRAN packages, a resource of a SC, and a mode of a BS for processing traffic to occur at a later time. For example, the scaling SC 1554 may obtain, by using the AI model, output data indicating that the number of vRAN packages is to be maintained and a resource corresponding to a SC of the vRAN package has to be decreased by 10%. Also, the scaling SC 1554 may obtain, by using the AI model, output data indicating that the second BS 20 from among the plurality of BSs 10, 20, and 30 is to transit to an off mode.

In this case, the scaling SC 1554 may request a virtualization master 1560 for scale down of the vRAN package 1540. When the virtualization master 1560 receives a scale down request from the scaling SC 1554, the virtualization master 1560 may transmit a scale down command to virtualization software 1530. The virtualization software 1530 may decrease a resource corresponding to the vRAN package 1540, in response to the scale down command.

Also, the virtualization master 1560 may transmit, to an O&M 1570, the output data indicating to transit the second BS 20 to an off mode, the second BS 20 being from among the plurality of BSs 10, 20, and 30. The O&M 1570 may transmit, to an EIU 50, a command commanding to transit the second BS 20 to an off mode, the second BS 20 being from among the plurality of BSs 10, 20, and 30.

Figure 16:
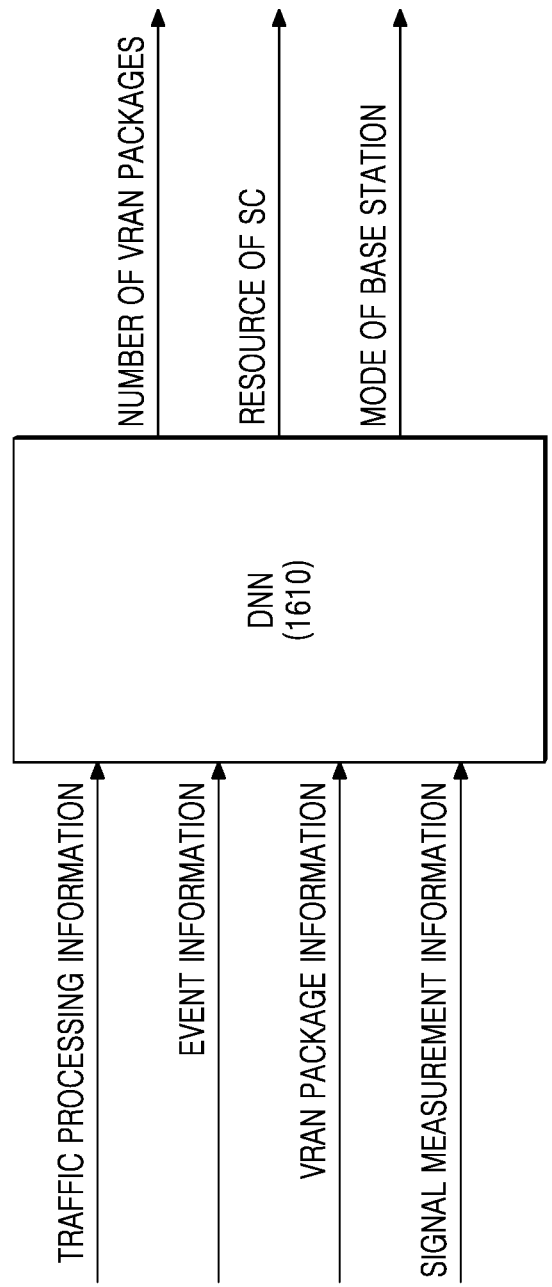
FIG. 16 is a diagram illustrating an example AI model used in adjusting the number of vRAN packages and a resource of a SC, in consideration of on/off of a BS, according to an embodiment of the disclosure.

FIG. 16 is a diagram for describing an AI model used in adjusting the number of vRAN packages and a resource of a SC, in consideration of on/off of a BS, according to an embodiment of the disclosure.

Referring to FIG. 16, traffic processing information, event information, vRAN package information, and signal measurement information may be applied as input data to an AI model 1610. The server 1500 described above with reference to FIG. 15 may train the AI model 1610, based on a result of comparison between output data with evaluation data, the output data being obtained as a result of applying the input data to the AI model 1610. For example, the server 1500 may apply various input data to the AI model 1610 until a difference between the output data and the evaluation data becomes less than a preset threshold value. According to another embodiment of the disclosure, the server 1500 may train the AI model 1610 by applying the input data along with a value of the difference between the output data and the evaluation data to the AI model 1610. Through the training, a value of a parameter of each of layers constituting a neural network of the AI model 1610 may be modified and refined. However, this is merely an example, and thus a method of training an AI model is not limited to the aforementioned examples.

Figure 17:
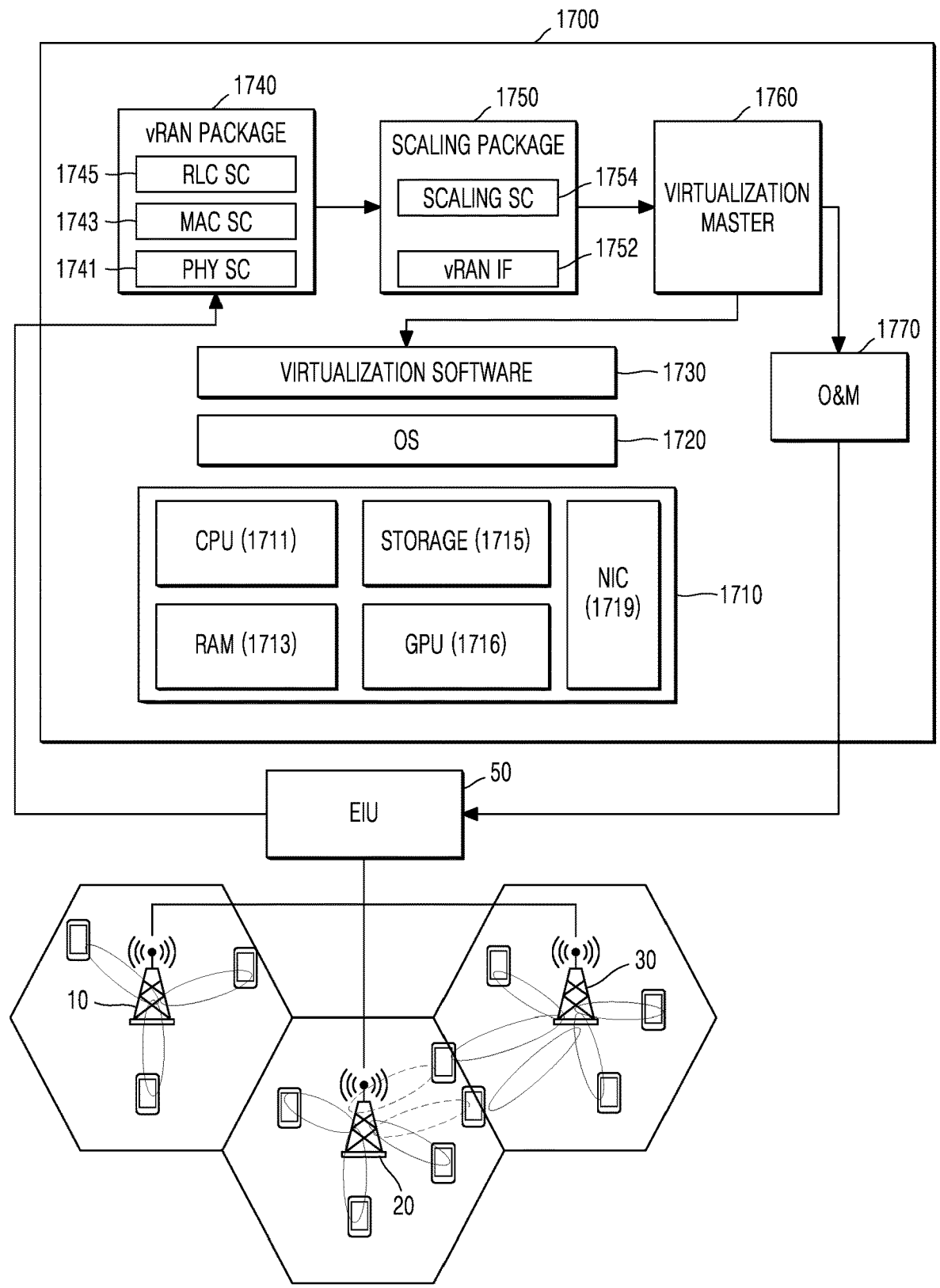
FIG. 17 is a diagram illustrating an example method, performed by a vRAN, of adjusting the number of vRAN packages and a resource of a SC, in consideration of load balancing of a BS, using a pre-generated AI model, according to an embodiment of the disclosure.

FIG. 17 is a diagram for describing a method, performed by a vRAN, of adjusting the number of vRAN packages and a resource of a SC, in consideration of load balancing of a BS, by using a pre-generated AI model, according to an example embodiment of the disclosure.

Referring to FIG. 17, a server 1700 may include hardware 1710 capable of driving software for performing a vRAN function. The hardware 1710 may include a CPU, a RAM, a storage, a GPU, and a NIC but this is merely an example, and elements of the hardware 1710 are not limited thereto.

An OS 1720 may manage software (e.g., virtualization software 1730) that is executed in the hardware 1710 and the server 1700.

The virtualization software 1730 may manage the hardware 1710 to process traffic.

Hereinafter, a method of determining the number of vRAN packages 1740, a resource to be allocated to a SC, and loads of a plurality of BSs 10, 20, and 30, the method being performed to process traffic of the plurality of BSs 10, 20, and 30, will now be described in detail. Hereinafter, the plurality of BSs 10, 20, and 30 may also be referred to as the first, second, and third BSs 10, 20, and 30.

The vRAN package 1740 may process traffic occurred in the plurality of BSs 10, 20, and 30, based on an allocated resource. The vRAN package 1740 may transmit traffic processing information to a vRAN IF 1752. Also, the vRAN package 1740 may receive, from the plurality of BSs 10, 20, and 30, signal measurement information obtained from each of a plurality of UEs respectively connected to the plurality of BSs 10, 20, and 30. The signal measurement information is information indicating a reception power of a reference signal transmitted from each of the plurality of BSs 10, 20, and 30. The signal measurement information may include information indicating a power of a reference signal received from a BS (e.g., the BS 10) that a UE camps on, and information indicating a power of a reference signal received from a neighboring BS (e.g., the BS 20) adjacent to the BS that the UE camps on.

Also, the vRAN package 1740 may obtain, from the plurality of BSs 10, 20, and 30, a plurality of pieces of capability information of respective UEs connected to the plurality of BSs 10, 20, and 30. The capability information may include information about a type of a radio access technology, a bandwidth part (BWP), or the like which is supported by each UE.

According to another embodiment of the disclosure, the vRAN IF 1752 may obtain event information from an external server or via a user input.

The vRAN IF 1752 may transmit the traffic processing information, the signal measurement information, the capability information of a UE, and the event information to a scaling SC 1754. According to an example embodiment of the disclosure, the scaling SC 1754 may determine the number of vRAN packages, a resource of a SC, and a load of each of a plurality of BSs for processing traffic to occur at a later time, based on the current number of vRAN package(s) 1740 and a resource allocated to each SC of the vRAN package 1740, and the traffic processing information, the signal measurement information, the capability information of the UE, and the event information that are obtained from the vRAN IF 1752. In an example embodiment of the disclosure, for convenience of description, the current number of the vRAN packages 1740 and the resource allocated to each SC of the vRAN package 1740 are referred to as vRAN package information. Also, a load of a BS denotes traffic the BS has to process, and may be indicated as the number of UEs accessing the BS, traffic occurring in a UE accessing the BS, or the like.

To determine the number of vRAN packages, the resource of the SC, and the mode of the BS for processing traffic to occur at a later time, the scaling SC 1754 may use a pre-generated AI model. The AI model denotes an artificial neural network model simulating a neural network of a human) brain, and is not limited to an artificial neural network model using a particular algorithm. The AI model may be stored in a CPU of the hardware 1710 but this is merely an example and thus the AI model may be stored in an external server.

For training of the AI model used in the embodiment of FIG. 17, input data and evaluation data as below may be used.

| Input data | Evaluation data |
| --- | --- |
| (1) traffic processing information | (1) the number of vRAN packages |
| (2) event information | (2) resource of SC |
| (3) vRAN package information | (3) load of BS |
| (4) signal measurement information | |
| (5) capability information of UE | |

The input data according to an embodiment of the disclosure may include the traffic processing information, the event information, the vRAN package information, the signal measurement information, and the capability information of the UE. The evaluation data may include the number of vRAN packages, a resource of a SC, and a load of a BS. The parameter denotes a value used in a calculation process of each of the layers constituting the neural network of the AI model, and may include a weight to be used in applying an input value to a preset calculation formula. Also, the parameter may be a value set as a result of training, and the value of the parameter may be modified and refined based on the input data of the AI model. For example, the parameter of the AI model may be trained by comparing output data with the evaluation data, the output data being obtained as a result of applying the input data to the AI model.

The scaling SC 1754 may determine, by using the AI model, the number of vRAN packages, a resource of a SC, and a load of each of the plurality of BSs 10, 20, and 30 for processing traffic to occur at a later time. For example, the scaling SC 1754 may obtain, by using the AI model, output data indicating that the number of vRAN packages and a resource to be allocated to a SC of the vRAN package are to be maintained. Also, the scaling SC 1754 may obtain, by using the AI model, output data indicating that a load of the first BS 10 from among the plurality of BSs 10, 20, and 30 is to be maintained whereas 20% of a load of the second BS 20 has to be processed by the third BS 20.

In this case, in order to allow the number of vRAN packages and a resource to be maintained and to allow 20% of the load of the second BS 20 to be processed by the third BS 20, the scaling SC 1754 may transmit, to the virtualization software 1730, a handover command to connect some UEs to the third BS 30, the some UEs having been connected to the second BS 20. The virtualization software 1730 may transmit, to an O&M 1770, output data commanding a handover by which some UEs that have been connected to the second BS 20 from among the plurality of BSs 10, 20, and 30 are to be connected to the third BS 30. The O&M 1770 may transmit a handover command to the EIU 50.

Figure 18:
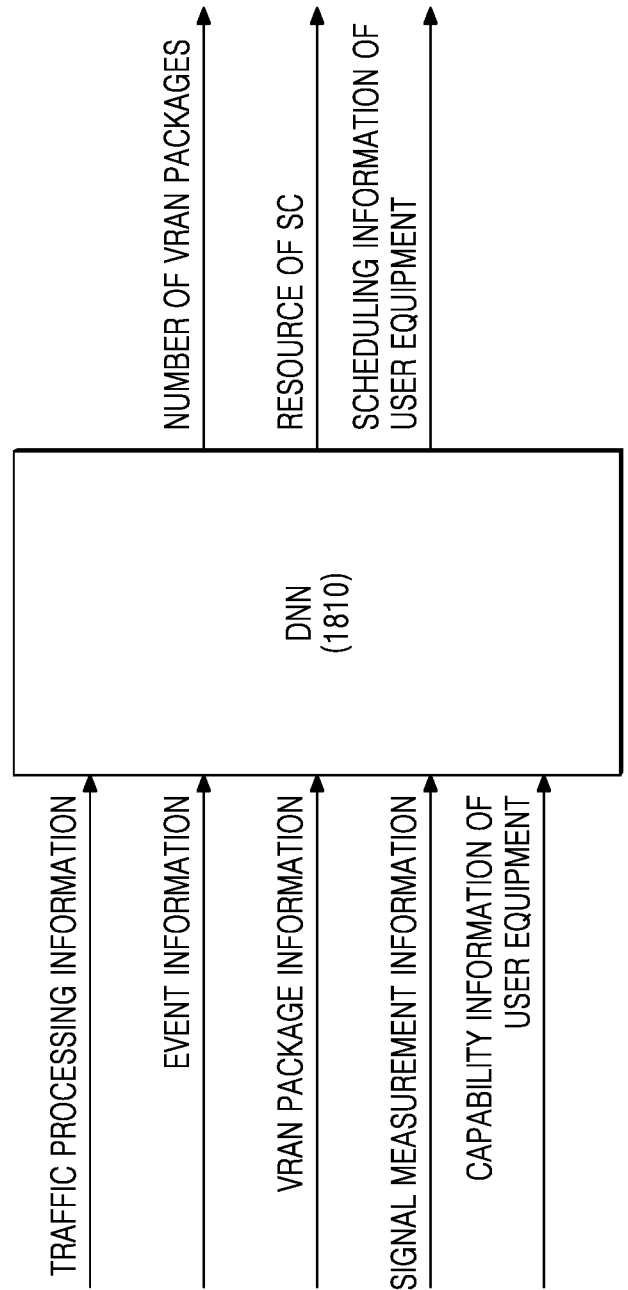
FIG. 18 is a diagram illustrating an example AI model used in adjusting the number of vRAN packages and a resource of a SC, in consideration of load balancing of a BS, according to an embodiment of the disclosure.

FIG. 18 is a diagram for describing an AI model used in adjusting the number of vRAN packages and a resource of a SC, in consideration of load balancing of a BS, according to an example embodiment of the disclosure.

Referring to FIG. 18, traffic processing information, event information, vRAN package information, signal measurement information, and capability information of a UE may be applied as input data to an AI model 1810. The server 1700 described above with reference to FIG. 17 may train the AI model 1810, based on a result of comparison between output data with evaluation data, the output data being obtained as a result of applying the input data to the AI model 1810. For example, the server 1700 may apply various input data to the AI model 1810 until a difference between the output data and the evaluation data becomes less than a preset threshold value. According to another embodiment of the disclosure, the server 1700 may train the AI model 1810 by applying the input data along with a value of the difference between the output data and the evaluation data to the AI model 1810. Through the training, a value of a parameter of each of layers constituting a neural network of the AI model 1810 may be modified and refined. However, this is merely an example, and thus a method of training an AI model is not limited to the aforementioned examples.

Figure 19:
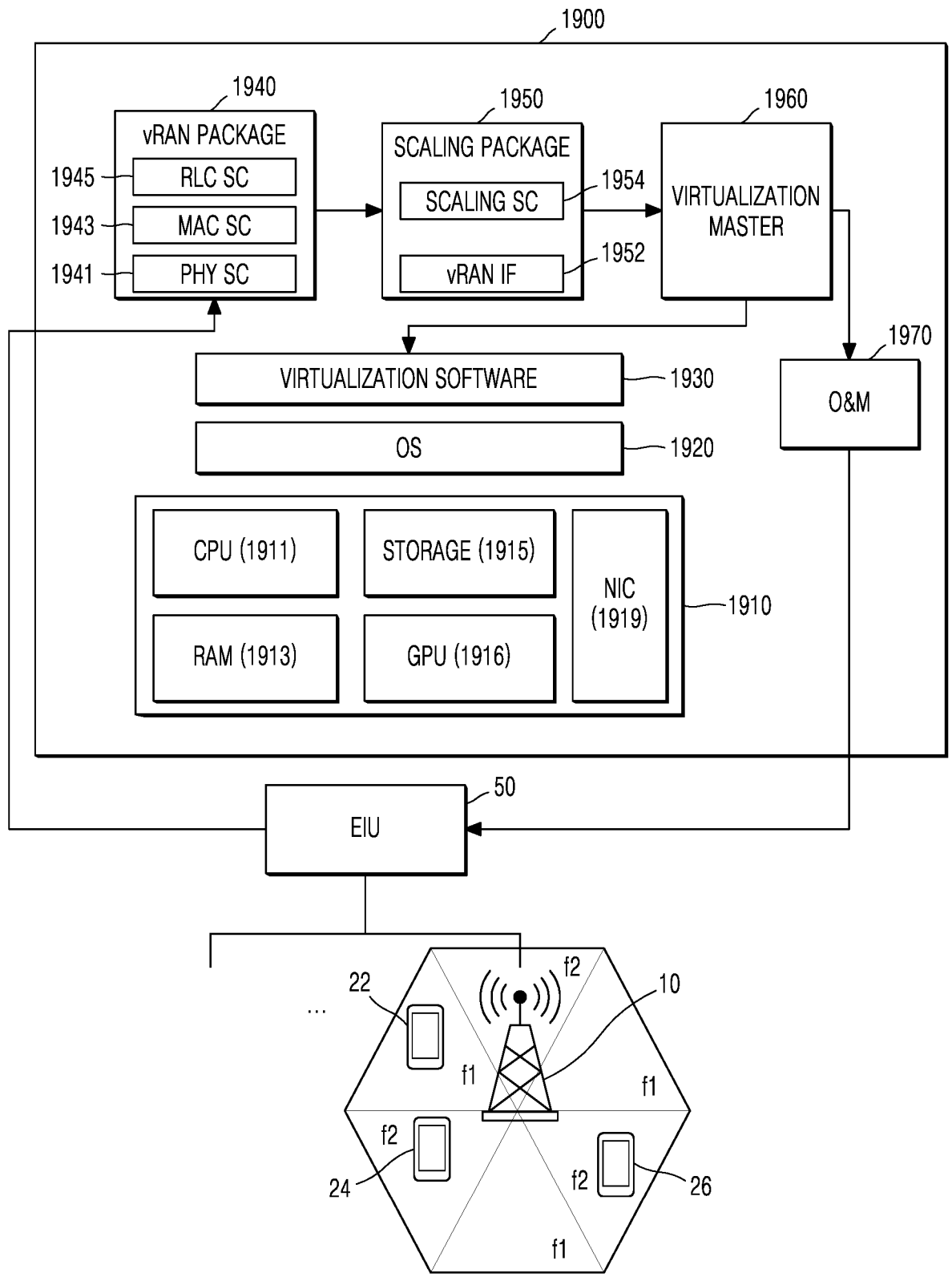
FIG. 19 is a diagram illustrating an example method, performed by a vRAN, of adjusting the number of vRAN packages and a resource and performing scheduling of a user equipment (UE) using a pre-generated AI model, according to an embodiment of the disclosure.

FIG. 19 is a diagram for describing a method, performed by a vRAN, of adjusting the number of vRAN packages and a resource and performing scheduling of a UE by using a pre-generated AI model, according to an example embodiment of the disclosure.

Referring to FIG. 19, a server 1900 may include hardware 1910 capable of driving software for performing a vRAN function. The hardware 1910 may include a CPU, a RAM, a storage, a GPU, and a NIC but this is merely an example, and elements of the hardware 1910 are not limited thereto.

An OS 1920 may manage software (e.g., virtualization software 1930) that is executed in the hardware 1910 and the server 1900.

The virtualization software 1930 may manage the hardware 1910 to process traffic.

Hereinafter, a method of determining the number of vRAN packages 1940 and/or the number of SCs, a resource to be allocated to a SC, and scheduling information of a plurality of UEs 22, 24, and 26, the method being performed to process traffic of the plurality of UEs 22, 24, and 26 connected to a BS 10, will now be described in detail. Hereinafter, the plurality of UEs 22, 24, and 26 may also be referred to as the first, second, and third UEs 22, 24, and 26.

The vRAN package 1940 may process traffic of the plurality of UEs 22, 24, and 26 occurred in the BS 10, based on an allocated resource. The vRAN package 1940 may transmit traffic processing information to a vRAN IF 1952. Also, the vRAN package 1940 may receive, via the BS 10, channel state information estimated by each of the plurality of UEs 22, 24, and 26 connected to the BS 10 and capability information of each of the plurality of UEs 22, 24, and 26. The channel state information may be estimated by each of the plurality of UEs 22, 24, and 26, in response to a channel state information-reference signal (CSI-RS) transmitted from the BS 10, and may include, but is not limited to, a CQI that is a channel quality indicator, a PMI that is a precoding matrix index, and a RI that is a rank index. Also, capability information of a UE may include information about a BWP supportable by the UE and the number of reception antennas, but this is merely an example and the capability information of the UE is not limited to the example.

According to another embodiment of the disclosure, the vRAN IF 1952 may obtain event information from an external server or via a user input.

The vRAN IF 1952 may transmit the traffic processing information, the channel state information of a UE, the capability information of the UE, and the event information to a scaling SC 1954. According to an embodiment of the disclosure, the scaling SC 1954 may determine the number of vRAN packages and/or number of SCs, a resource of a SC, and scheduling information of the UE for processing traffic to occur at a later time, based on the current number of vRAN packages 1940 and a resource allocated to each SC of the vRAN package 1940, and the traffic processing information, the channel state information of the UE, the capability information of the UE, and the event information that are obtained from the vRAN IF 1952. In this regard, the scheduling information of the UE denotes information indicating a time resource, a frequency resource, and a space resource by which the UE (e.g., the UE 22) may transmit and receive signals to and from the BS 10.

To determine the number of vRAN packages and/or SCs, the resource of the SC, and the scheduling information of the UE for processing traffic to occur at a later time, the scaling SC 1954 may use a pre-generated AI model. The AI model denotes an artificial neural network model simulating a neural network of a human brain, and is not limited to an artificial neural network model using a particular algorithm. The AI model may be stored in a CPU of the hardware 1910 but this is merely an example and thus the AI model may be stored in an external server.

For training of the AI model used in the embodiment of FIG. 19, input data and evaluation data as below may be used.

| Input data | Evaluation data |
|---|---|
| (1) traffic processing information | (1) the number of vRAN packages |
| (2) event information | (2) resource of SC |
| (3) vRAN package information | (3) scheduling information of UE |
| (4) capability information of UE | |
| (5) channel state information of UE | |

The input data according to an embodiment of the disclosure may include the traffic processing information, the event information, the vRAN package information, the capability information of the UE, and the channel state information of the UE. The evaluation data may include the number of vRAN packages, a resource of a SC, and the scheduling information of the UE. The parameter denotes a value used in a calculation process of each of the layers constituting the neural network of the AI model, and may include a weight to be used in applying an input value to a preset calculation formula. Also, the parameter may be a value set as a result of training, and the value of the parameter may be modified and refined based on the input data of the AI model. For example, the parameter of the AI model may be trained by comparing output data with the evaluation data, the output data being obtained as a result of applying the input data to the AI model.

The scaling SC 1954 may determine, by using the AI model, the number of vRAN packages and/or SCs, a resource of a SC, and the scheduling information of the UE for processing traffic to occur at a later time. For example, the scaling SC 1954 may obtain, by using the AI model, output data indicating that the number of vRAN packages is to be increased whereas a resource allocated to a SC of each of the vRAN packages is to be maintained. Also, the scaling SC 1954 may obtain, by using the AI model, the scheduling information that is information about at least one of a time, a frequency resource, or a beam vector, with which each of the plurality of UEs 22, 24, and 26 connected to the BS 10 can transmit traffic to the BS 10. In this regard, the beam vector denotes a parameter that is capable of spatially separating signals transmitted from the plurality of UEs 22, 24, and 26, respectively.

In this case, the scaling SC 1954 may request a virtualization master 1960 for scale out of the vRAN packages 1940. When the virtualization master 1960 receives a scale out request from the scaling SC 1954, the virtualization master 1960 may transmit a scale out command to the virtualization software 1930. The virtualization software 1930 may increase the number of the vRAN packages 1940 and/or SCs, in response to the scale out command.

Also, the virtualization master 1960 may transmit, to an O&M 1970, scheduling information of each of the plurality of UEs 22, 24, and 26 connected to the BS 10. The scheduling information may include information indicating that a BWP whose intermediate frequency is f1 is configured for the first UE 22, and a BWP whose intermediate frequency is f2 is configured for the second UE 24 and the third UE 26. The O&M 1970 may transmit, to the EIU 50, a command to transmit the scheduling information to the BS 10.

The server 1900 according to an embodiment of the disclosure may consider, by using the AI model, capability of each UE, channel state information, and traffic to occur at a later time, and thus may determine the number of vRAN packages, a SC resource, and scheduling information of a UE for efficiently using given network resources.

Figure 20:
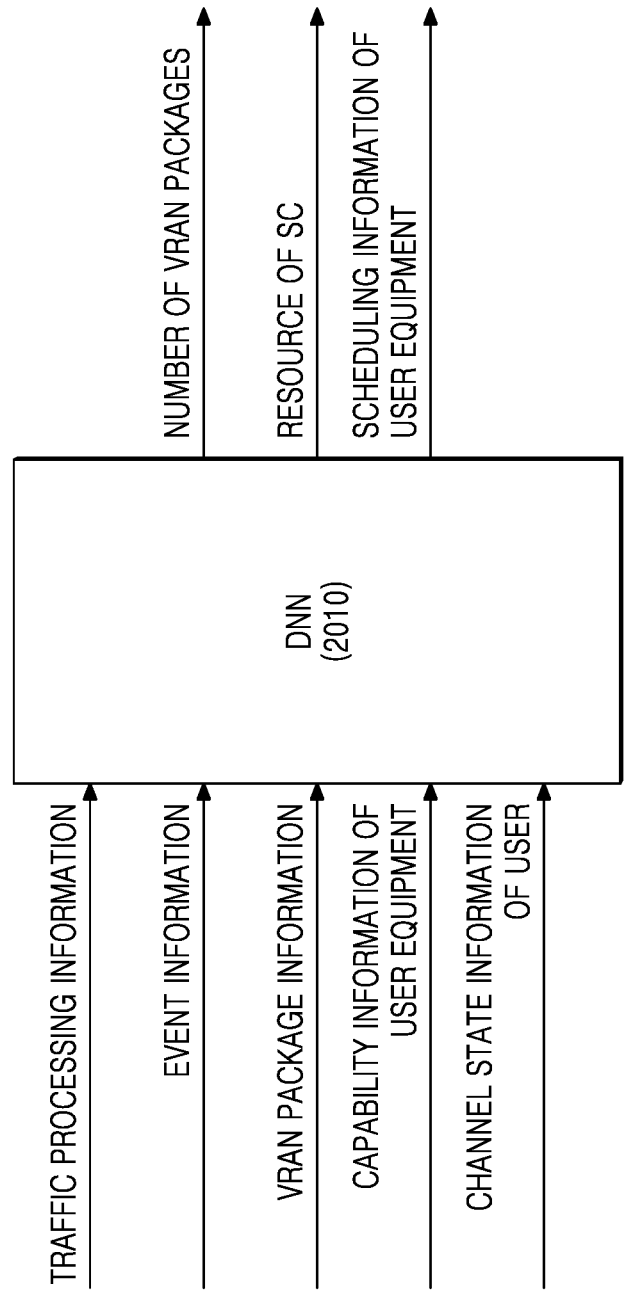
FIG. 20 is a diagram illustrating an example AI model used in adjusting the number of vRAN packages and a resource of a SC, in consideration of scheduling of a UE, according to an embodiment of the disclosure.

FIG. 20 is a diagram for describing an AI model used in adjusting the number of vRAN packages and a resource of a SC, in consideration of scheduling of a UE, according to an example embodiment of the disclosure.

Referring to FIG. 20, traffic processing information, event information, vRAN package information, channel state information of a UE, and capability information of the UE may be applied as input data to an AI model 2010. The server 1900 described above with reference to FIG. 19 may train the AI model 2010, based on a result of comparison between output data with evaluation data, the output data being obtained as a result of applying the input data to the AI model 2010. For example, the server 1900 may apply various input data to the AI model 2010 until a difference between the output data and the evaluation data becomes less than a preset threshold value. According to another embodiment of the disclosure, the server 1900 may train the AI model 2010 by applying the input data along with a value of the difference between the output data and the evaluation data to the AI model 2010. Through the training, a value of a parameter of each of layers constituting a neural network of the AI model 2010 may be modified and refined. However, this is merely an example, and thus a method of training an AI model is not limited to the aforementioned examples.

Elements in a block diagram may be combined, an element may be added thereto, or at least one of the elements may be omitted according to actual specifications of an apparatus. That is, at least two elements may be combined to one element, or one element may be divided into two elements when necessary. Also, functions performed by each element are for describing the embodiments of the disclosure, and detailed operations or devices do not limit the scope of the disclosure.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments of the disclosure may be applied to various systems such as a Frequency Division Duplex (FDD) LTE system, a Time Division Duplex (TDD) LTE system, a 5G or NR system, or the like.

What is claimed is:

1. A method of performing, by a server for performing radio access network (RAN) functions, the method comprising:
   obtaining traffic processing information for at least one event, wherein the traffic processing information comprises, information about traffic occurred in each RAN function among the RAN functions, and information about at least one resource used for processing the traffic at each software components (SCs) virtualizing the each RAN function;
   wherein the RAN function comprises at least one of a physical (PHY) layer function, a medium access control (MAC) layer function, a radio link control (RLC) layer function, or a packet data convergence protocol (PDCP) layer function;
   identifying amount of traffic occurred in the each RAN function for an event among the at least one event, based on the traffic processing information;
   predicting amount of traffic to occur in the each RAN function, based at least on the identified amount of the traffic;
   identifying at least one of a non-dedicated resource node or a dedicated resource node to be assigned to the each RAN function, based on the predicted amount of the traffic to occur in the each RAN function, wherein the non-dedicated resource node includes at least one core and at least one memory capable of processing traffic of the RAN functions and the dedicated resource node includes at least one core and at least one memory dedicated to perform allocated RAN function; and
   allocating at least one of the identified dedicated resource node or the identified non-dedicated resource node to the each RAN function for processing the traffic to occur in the each RAN function;
   wherein the predicting of the amount of the traffic to occur comprises: identifying a pattern of an amount of traffic which has occurred in each of time-frequency resource domains, based on the traffic processing information; and predicting amount of traffic to occur in a particular time-frequency resource domain, based on the pattern of the amount of the traffic.

2. The method of claim 1, wherein the obtaining of the traffic processing information comprises receiving the traffic processing information from a plurality of BSs connected to the server or an external device connected to the server.

3. The method of claim 1, further comprising:
   increasing a number of the SCs based on increase of the predicted amount of the traffic to occur, and
   decreasing the number of the SCs based on decrease of the predicted amount of the traffic to occur.

4. The method of claim 1, further comprising adjusting the number of the SCs in a unit of a package comprising a plurality of SCs.

5. The method of claim 1, wherein the allocating comprises, based on increase of an amount of traffic to occur in a particular RAN function, increasing a number of the dedicated resource node of an SC to perform the particular RAN function.

6. The method of claim 1, wherein the SC comprises at least one of a container or a virtual machine (VM).

7. A server for performing radio access network (RAN) functions, the server comprising:
   a transceiver;
   a memory storing one or more instructions; and
   at least one processor configured to execute the one or more instructions stored in the memory to:
   obtain traffic processing information for at least one event, wherein the traffic processing information comprises information about traffic occurred in each RAN function among the RAN functions, and information about at least one resource used for processing the traffic at each software components (SCs) virtualizing the each RAN function,
   wherein the RAN function comprises at least one of a physical (PHY) layer function, a medium access control (MAC) layer function, a radio link control (RLC) layer function, or a packet data convergence protocol (PDCP) layer function;
   identify amount of traffic occurred in the each RAN function for an event, among the at least one event, based on the traffic processing information,
   predict amount of traffic to occur in the each RAN function, based at least on the identified amount of the traffic,
   identify at least one of a non-dedicated resource node or a dedicated resource node to be assigned to the each RAN function, based on the predicted amount of the traffic to occur in the each RAN function, wherein the non-dedicated resource node includes at least one core and at least one memory capable of processing traffic of the RAN functions and the dedicated resource node includes at least one core and at least one memory dedicated to perform allocated RAN function, and
   allocate at least one of the identified dedicated resource node or the identified non-dedicated resource node to the each RAN function for processing the traffic to occur in the each RAN function;
   wherein the predict of the amount of the traffic to occur comprises: identify a pattern of an amount of traffic occurred in each of time-frequency resource domains, based on the traffic processing information; and predict amount of traffic to occur in a particular time-frequency resource domain, based on the pattern of the amount of the traffic.

8. The server of claim 7, wherein the at least one processor is further configured to execute the one or more instructions to receive the traffic processing information from the plurality of BSs connected to the server or an external device connected to the server.

9. The server of claim 7, wherein the at least one processor is further configured to execute the one or more instructions to:
   increase a number of the SCs based on increase of the predicted amount of the traffic to occur, and
   decrease the number of the SCs based on decrease of the predicted amount of the traffic to occur.

10. The server of claim 7, wherein the at least one processor is further configured to execute the one or more instructions to adjust the number of the SCs in a unit of a package comprising a plurality of SCs.

11. The method of claim 7, wherein the at least one processor is further configured to execute the one or more instructions to: based on increase of an amount of traffic to occur in a particular RAN function, increasing the dedicated resource node of an SC to perform the particular RAN function.

12. The server of claim 7, wherein each of the SCs comprises at least one of a container or a virtual machine (VM).

13. A computer program product comprising a non-transitory, computer-readable recording medium having recorded thereon a program, which when executed by a server, causes the server to perform a method of performing radio access network (RAN) functions, the method comprising:
- obtaining traffic processing information for at least one event, wherein the traffic processing information comprises information about traffic occurred in each RAN function among the RAN functions, and information about at least one resource used for processing the traffic at each software components (SCs) virtualizing the each RAN function;
- wherein the RAN function comprises at least one of a physical (PHY) layer function, a medium access control (MAC) layer function, a radio link control (RLC) layer function, or a packet data convergence protocol (PDCP) layer function;
- identifying amount of traffic occurred in the each RAN function for an event, based on the traffic processing information;
- predicting amount of traffic to occur in the each RAN function, based on the identified amount of the traffic;
- identifying at least one of a non-dedicated resource node or a dedicated resource node to be assigned to the each RAN function, based at least on the predicted amount of the traffic to occur in the each RAN function, wherein the non-dedicated resource node includes at least one core and at least one memory capable of processing traffic of the RAN functions and the dedicated resource node includes at least one core and at least one memory dedicated to perform allocated RAN function; and
- allocating at least one of the identified dedicated resource node or the identified non-dedicated resource node to the each RAN function for processing the traffic to occur in the each RAN function;
  - wherein the predicting of the amount of the traffic to occur comprises: identifying a pattern of an amount of traffic which has occurred in each of time-frequency resource domains, based on the traffic processing information; and predicting amount of traffic to occur in a particular time-frequency resource domain, based on the pattern of the amount of the traffic.

* * * * *